US012216425B2

(12) United States Patent
Nagata et al.

(10) Patent No.: US 12,216,425 B2
(45) Date of Patent: Feb. 4, 2025

(54) IMAGE FORMING SYSTEM

(71) Applicant: CANON KABUSHIKI KAISHA, Tokyo (JP)

(72) Inventors: Teppei Nagata, Chiba (JP); Tomohito Nakagawa, Chiba (JP); Yukihiro Soeta, Kanagawa (JP); Shogo Terakawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/975,419

(22) Filed: Oct. 27, 2022

(65) Prior Publication Data

US 2023/0048400 A1 Feb. 16, 2023

Related U.S. Application Data

(62) Division of application No. 17/322,786, filed on May 17, 2021, now Pat. No. 11,520,266.

(30) Foreign Application Priority Data

May 26, 2020 (JP) ................................ 2020-091497
Dec. 28, 2020 (JP) ................................ 2020-218807

(51) Int. Cl.
*G03G 15/00* (2006.01)

(52) U.S. Cl.
CPC ..... *G03G 15/5062* (2013.01); *G03G 15/6573* (2013.01); *G03G 2215/00569* (2013.01);
(Continued)

(58) Field of Classification Search
CPC ..... G03G 15/6573; G03G 2215/00616; G03G 2215/00738; G03G 2215/00569;
(Continued)

(56) References Cited

U.S. PATENT DOCUMENTS 8,693,060 B2 4/2014 Ito ................................ 358/3.26
2010/0290093 A1 11/2010 Ito ................................ 358/461
(Continued)

FOREIGN PATENT DOCUMENTS

JP 2006339753 A 12/2006
JP 2007-143083 6/2007
(Continued)

OTHER PUBLICATIONS

Office Action dated Jul. 9, 2023 in counterpart Chinese Application No. 202110556911.2, together with English translation thereof.
(Continued)

*Primary Examiner* — Jennifer Bahls
(74) *Attorney, Agent, or Firm* — Venable LLP

(57) ABSTRACT

An image forming system including: a reading unit configured to read, through a transparent member, an image on a first sheet conveyed by a conveyance unit; an opposed member provided opposite to the reading unit with respect to the transparent member, the first sheet passing through a gap between the opposed member and the transparent member; and at least one processor configured to control, based on the image read by the reading unit, a geometric characteristic of an image to be formed on a second sheet by an image forming portion, and control a changing unit to change the size of the gap to a first size when the thickness of the first sheet is a first thickness, and to a second size larger than the first size when the thickness of the first sheet is a second thickness larger than the first thickness.

23 Claims, 15 Drawing Sheets

(52) U.S. Cl.
CPC ............ *G03G 2215/00616* (2013.01); *G03G 2215/00738* (2013.01)

(58) Field of Classification Search
CPC .......... G03G 51/5062; G03G 15/6572; H04N 1/401; H04N 1/12
See application file for complete search history.

(56) References Cited

U.S. PATENT DOCUMENTS

| | | | | |
|---|---|---|---|---|
| 2012/0013955 | A1 * | 1/2012 | Ikeda | H04N 1/203<br>358/461 |
| 2014/0079460 | A1 | 3/2014 | Kanaya | B41J 13/00 |
| 2017/0149989 | A1 * | 5/2017 | Watanabe | G03G 15/55 |
| 2017/0223204 | A1 | 8/2017 | Ooishi | H04N 1/00 |
| 2018/0173478 | A1 | 6/2018 | Hayakawa | G03G 15/01 |
| 2018/0288240 | A1 * | 10/2018 | Xu | H04N 1/6033 |
| 2021/0377406 | A1 | 12/2021 | Nakagawa et al. | H04N 1/00 |

FOREIGN PATENT DOCUMENTS

| | | | | |
|---|---|---|---|---|
| JP | 2007143083 | A | * | 6/2007 |
| JP | 2010153982 | A | | 7/2010 |
| JP | 2010-268058 | | | 11/2010 |
| JP | 2012023696 | A | | 2/2012 |
| JP | 2014-012594 | | | 1/2014 |
| JP | 2018-198359 | | | 12/2018 |
| JP | 2019098734 | A | | 6/2019 |

OTHER PUBLICATIONS

Japanese Office Action issued Sep. 3, 2024 in corresponding Japanese Patent Appln. No. 2020-218807.

* cited by examiner

| BASIS WEIGHT BW [g/m2] | THICKNESS OF SHEET [mm] | MARGIN GAP A [mm] | AMOUNT OF GAP G [mm] | ROTATION POSITION OF ABUTMENT MEMBER RP | CLEARANCE C [mm] |
|---|---|---|---|---|---|
| 52≦BW≦150 | 0.15 | 0.20 | 0.35 | G(1) | 2.15 |
| 150<BW≦250 | 0.25 | 0.30 | 0.55 | G(2) | 2.35 |
| 250<BW≦300 | 0.40 | 0.40 | 0.80 | G(3) | 2.60 |
| 300<BW≦400 | 0.50 | 0.40 | 0.90 | G(4) | 2.70 |
| | | | 1.20 | G(5) | 3.00 |

*FIG. 13*

| BASIS WEIGHT BW [g/m2] | THICKNESS OF SHEET [mm] | MARGIN GAP A [mm] | AMOUNT OF GAP G [mm] | ROTATION POSITION OF ABUTMENT MEMBER |
|---|---|---|---|---|
| 52≦BW≦100 | 0.15 | 0.15 | 0.30 | G(1) |
| 100<BW≦150 | 0.20 | 0.15 | 0.35 | G(2) |
| 150<BW≦200 | 0.25 | 0.30 | 0.55 | G(3) |
| 200<BW≦300 | 0.40 | 0.40 | 0.80 | G(4) |
| 300<BW≦350 | 0.45 | 0.40 | 0.85 | G(5) |
| 350<BW≦400 | 0.50 | 0.40 | 0.90 | G(6) |
| 400<BW≦450 | 0.60 | 0.40 | 1.00 | G(7) |
| | | | 1.20 | G(8) |

FIG. 14

900 910 901 902 920

| SHEET TYPE | LENGTH OF SUB-SCANNING DIRECITON [mm] | LENGTH OF MAIN SCANNING DIRECITON [mm] | BASIS WEIGHT [g/m2] | SURFACE PROPERTY | COLOR | PRE-PRINTED SHEET | FIRST GEOMETRIC ADJUSTMENT VALUE (FOR FRONT SIDE) | SECOND GEOMETRIC ADJUSTMENT VALUE (FOR BACK SIDE) | READ GAP AMOUNT |
|---|---|---|---|---|---|---|---|---|---|
| ABC PAPER RECYCLING 1 | 210 | 297 | 75 | PLAIN PAPER | WHITE | NO | LEAD POS.: 0.3mm<br>SIDE POS.: -0.1mm<br>MAIN-SCAN MAG.: +0.02%<br>SUB-SCAN MAG.: +0.01% | LEAD POS.: 0.2mm<br>SIDE POS.: 0.1mm<br>MAIN-SCAN MAG.: +0.02%<br>SUB-SCAN MAG.: −0.03% | G(1) |
| ABC PAPER RECYCLING 2 | 297 | 420 | 75 | PLAIN PAPER | WHITE | NO | LEAD POS.: 0.0mm<br>SIDE POS.: −0.0mm<br>MAIN-SCAN MAG.: +0.00%<br>SUB-SCAN MAG.: +0.00% | LEAD POS.: 0.0mm<br>SIDE POS.: −0.0mm<br>MAIN-SCAN MAG.: +0.00%<br>SUB-SCAN MAG.: +0.00% | G(1) |
| DEF PAPER EMBOSS A-1 | 216 | 279 | 150 | EMBOSS | WHITE | NO | LEAD POS.: 0.5mm<br>SIDE POS.: −0.5mm<br>MAIN-SCAN MAG.: +0.02%<br>SUB-SCAN MAG.: +0.02% | LEAD POS.: −0.3mm<br>SIDE POS.: 0.5mm<br>MAIN-SCAN MAG.: +0.01%<br>SUB-SCAN MAG.: −0.03% | G(3) |
| DEF PAPER COAT PAPER P-1 | 279 | 432 | 128 | BOTH SIDE COAT PAPER | WHITE | NO | LEAD POS.: 0.4mm<br>SIDE POS.: −0.2mm<br>MAIN-SCAN MAG.: +0.12%<br>SUB-SCAN MAG.: +0.08% | LEAD POS.: −0.2mm<br>SIDE POS.: 0.6mm<br>MAIN-SCAN MAG.: −0.02%<br>SUB-SCAN MAG.: −0.01% | G(2) |
| XYZ PAPER COLOR 81 | 210 | 297 | 75 | PLAIN PAPER | ORANGE | NO | LEAD POS.: 0.0mm<br>SIDE POS.: −0.0mm<br>MAIN-SCAN MAG.: +0.00%<br>SUB-SCAN MAG.: +0.00% | LEAD POS.: 0.0mm<br>SIDE POS.: −0.0mm<br>MAIN-SCAN MAG.: +0.00%<br>SUB-SCAN MAG.: +0.00% | G(1) |
| XYZ PAPER COLOR 82 | 210 | 297 | 75 | PLAIN PAPER | PINK | NO | LEAD POS.: 0.0mm<br>SIDE POS.: −0.0mm<br>MAIN-SCAN MAG.: +0.00%<br>SUB-SCAN MAG.: +0.00% | LEAD POS.: 0.0mm<br>SIDE POS.: −0.0mm<br>MAIN-SCAN MAG.: +0.00%<br>SUB-SCAN MAG.: +0.00% | G(1) |
| FGH PAPER GRAPH PAPER 75 | 210 | 297 | 75 | PLAIN PAPER | WHITE | YES | LEAD POS.: 0.0mm<br>SIDE POS.: −0.0mm<br>MAIN-SCAN MAG.: +0.00%<br>SUB-SCAN MAG.: +0.00% | LEAD POS.: 0.0mm<br>SIDE POS.: −0.0mm<br>MAIN-SCAN MAG.: +0.00%<br>SUB-SCAN MAG.: +0.00% | G(1) |
| FGH PAPER PLAIN PAPER 2 | 210 | 297 | 75 | PLAIN PAPER | WHITE | NO | LEAD POS.: −0.03mm<br>SIDE POS.: −0.07mm<br>MAIN-SCAN MAG.: +0.06%<br>SUB-SCAN MAG.: −0.01% | LEAD POS.: −0.03mm<br>SIDE POS.: −0.10mm<br>MAIN-SCAN MAG.: +0.04%<br>SUB-SCAN MAG.: +0.02% | G(1) |

FIG. 15

1001

SHEET LIBRARY EDITING

910

| SHEET TYPE | LENGTH OF SHEET IN SUB-SCAN DIR [mm] | LENGTH OF SHEET IN MAIN SCAN DIR [mm] | BASIS WEIGHT [g/m2] | SURFACE PROPERTY | COLOR | |
|---|---|---|---|---|---|---|
| ABC PAPER RECYCLING 1 | 210 | 297 | 75 | PLAIN PAPER | WHITE | △ |
| ABC PAPER RECYCLING 2 | 297 | 420 | 75 | PLAIN PAPER | WHITE | |
| DEF PAPER EMBOSS A-1 | 216 | 279 | 150 | EMBOSS | WHITE | |
| DEF PAPER COAT PAPER P-1 | 279 | 432 | 128 | BOTH SIDE COAT | WHITE | |
| XYZ PAPER COLOR 81 | 210 | 297 | 75 | PLAIN PAPER | ORANGE | |
| XYZ PAPER COLOR 82 | 210 | 297 | 75 | PLAIN PAPER | PINK | ▽ |

NEW ADDITION | EDIT | DELETE | PRINT POSITION ADJUSTMENT

1002

IMAGE FORMING SYSTEM

This application is a divisional of application Ser. No. 17/322,786 filed May 17, 2021, currently pending; and claims priority under 35 U.S.C. § 119 from Japanese Patent Application No. 2020-218807 filed in Japan on Dec. 28, 2020 and from Japanese Patent Application No. 2020-091497 filed in Japan on May 26, 2020; and the contents of all of which are incorporated herein by reference as if set forth in full.

BACKGROUND OF THE INVENTION

Field of the Invention

The present invention relates to an image forming system.

Description of the Related Art

Hitherto, a reading apparatus configured to read an image of a sheet through use of an image sensor while conveying the sheet is known. In Japanese Patent Application Laid-Open No. 2010-268058, there is disclosed a reading apparatus configured to read an image of a conveyed sheet via a contact glass forming a conveyance path through which the sheet is conveyed. On an opposite side of the contact glass with respect to the conveyance path, a backing member (reference member) serving as a reading reference is arranged. The backing member forms a part of the conveyance path.

When the backing member forms a part of the conveyance path, the following problems may occur. Specifically, for example, in a case in which a gap between the backing member and the contact glass is set so that a sheet having a relatively large thickness, for example, thick paper, can be conveyed, when thin paper is conveyed, the thin paper may not be allowed to fall within a focal range of an image sensor. As a result, a reading accuracy is reduced. Meanwhile, for example, in a case in which the gap between the backing member and the contact glass is set based on the thickness of thin paper, when thick paper is conveyed, the thick paper may not be able to pass between the backing member and the contact glass, and thus jamming may occur.

SUMMARY OF THE INVENTION

According to an embodiment of the present invention, there is provided an image forming system comprising: an image forming portion configured to form an image on a first sheet; a conveyance unit configured to convey the first sheet on which the image has been formed by the image forming portion; a transparent member; a reading unit including a reading sensor configured to read, through the transparent member, the image on the first sheet conveyed by the conveyance unit, at a reading position in a conveyance direction in which the first sheet is conveyed; an opposed member, which is provided at the reading position in the conveyance direction, and is provided on a side opposite to the reading unit with respect to the transparent member, wherein the first sheet conveyed by the conveyance unit passes through a gap between the opposed member and the transparent member; a changing unit configured to change a size of the gap; and at least one processor configured to: control, based on the image read by the reading unit, a geometric characteristic of an image to be formed on a second sheet by the image forming portion, wherein the image forming portion is configured to form the image on the second sheet based on the geometric characteristic controlled by the at least one processor; acquire information related to a thickness of the first sheet; and control the changing unit so that the size of the gap becomes a first size when the thickness of the first sheet is a first thickness, and control the changing unit so that the size of the gap becomes a second size larger than the first size when the thickness of the first sheet is a second thickness larger than the first thickness.

Further features of the present invention will become apparent from the following description of exemplary embodiments with reference to the attached drawings.

BRIEF DESCRIPTION OF THE DRAWINGS

FIG. 13 is a diagram for showing a gap switching table for the abutment member in the modification example.

FIG. 14 is a table for showing a sheet library.

FIG. 15 is a view for illustrating a sheet library editing screen to be displayed on an operation portion.

DESCRIPTION OF THE EMBODIMENTS (Image Forming System)

Figure 1:
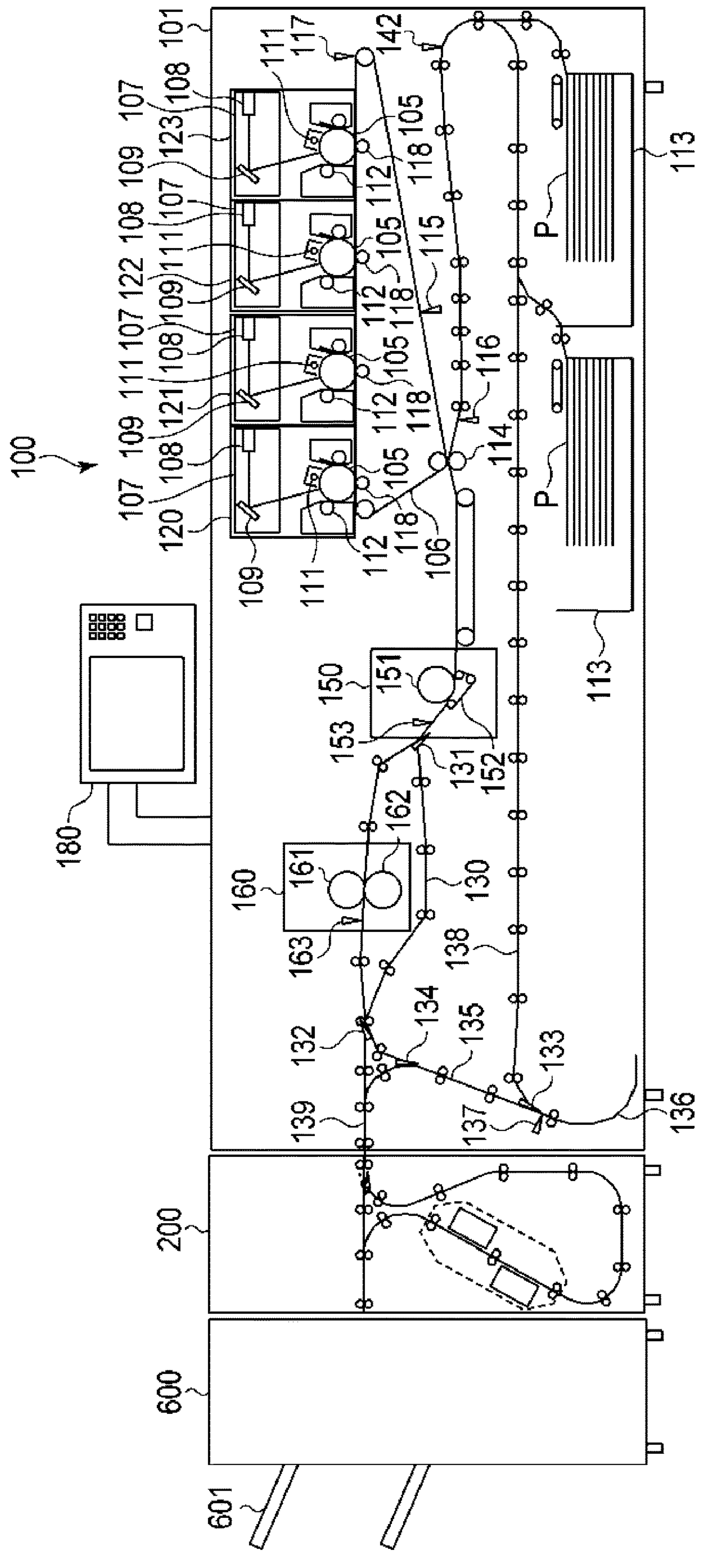
FIG. 1 is a partial cross-sectional view of an image forming system.

FIG. 1 is a partial cross-sectional view of an image forming system 100. The image forming system 100 includes an image forming apparatus (image forming portion) 101, an operation portion (user interface) 180, an adjustment unit (automatic adjustment apparatus) 200, and a post-processing apparatus (finisher) 600. The image forming apparatus 101 is configured to form an image on a recording medium (hereinafter referred to as “sheet”) P. The operation portion 180 is operated by a user in order to set a condition for image formation to be performed by the image forming apparatus 101, and is configured to display a state of the image forming apparatus 101 on a display portion. The adjustment unit 200 is configured to perform front/back registration for adjusting position misregistration between an image formed on a front side of the sheet P by the image forming apparatus 101 and an image formed on a back side of the sheet P by the image forming apparatus 101. The post-processing apparatus 600 is configured to discharge the sheet P having the image formed thereon to a discharge tray 601, and to perform post-processing including staple processing, punching processing, and sorting processing.

(Image Forming Apparatus)

The image forming apparatus 101 is an electrophotographic laser beam printer. The image forming apparatus 101 uses an electrophotographic image forming process to form an image on a sheet. Examples of the image forming apparatus 101 include not only a laser beam printer but also an electrophotographic copying machine (for example, digital copying machine), a color LED printer, a multifunction peripheral (MFP), a facsimile apparatus, and a printing machine. The image forming apparatus 101 is not limited to a color image forming apparatus configured to form a color image, and may be a monochrome image forming apparatus configured to form a monochrome image. The image forming apparatus 101 is not limited to an electrophotographic image forming apparatus, and may be an ink-jet printer, a sublimation type printer, or a heat-drying type thermal printer.

Figure 2:
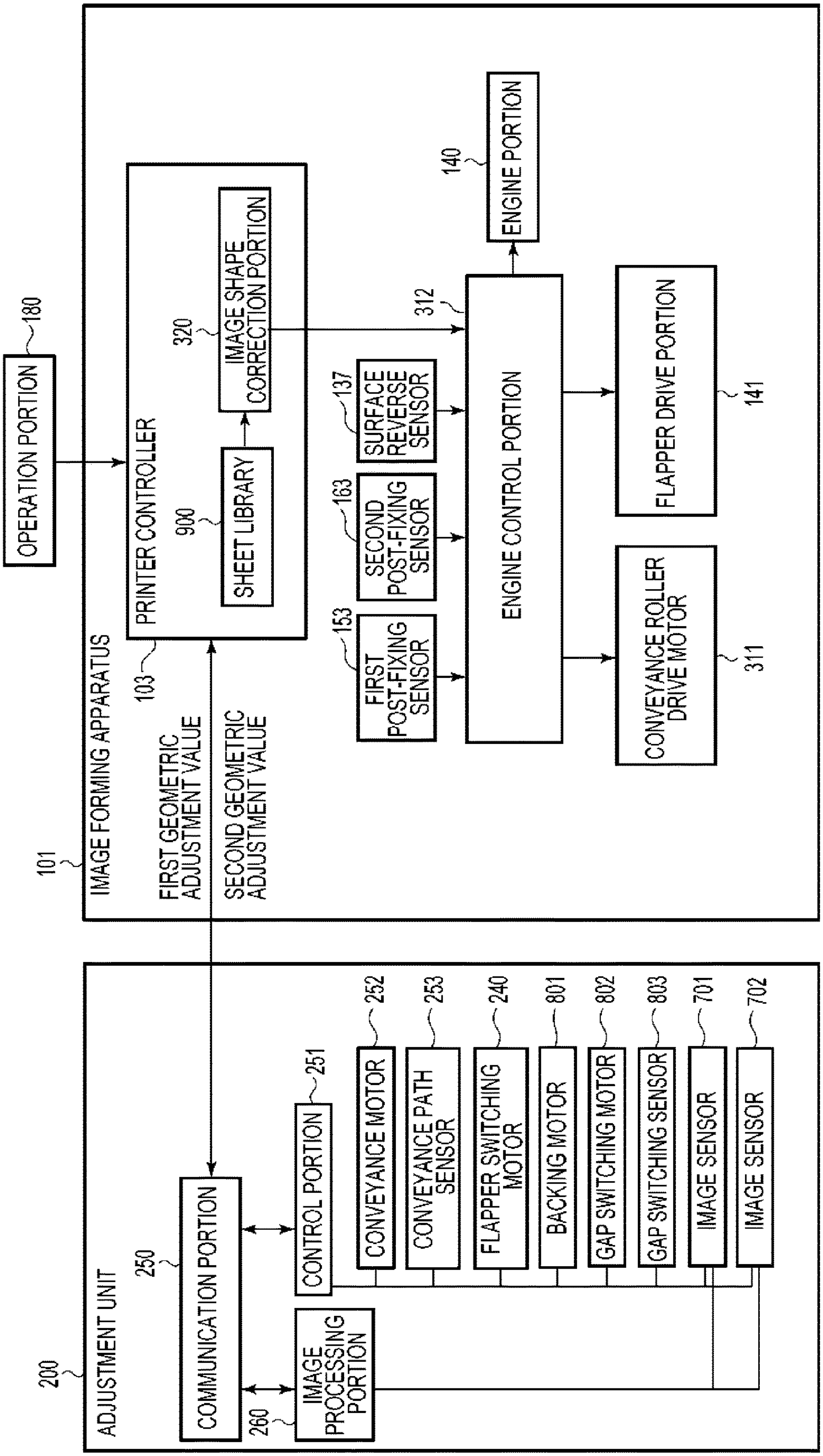
FIG. 2 is a block diagram of an image forming apparatus and an adjustment unit.

The image forming apparatus 101 is described with reference to FIG. 1 and FIG. 2. FIG. 2 is a block diagram of the image forming apparatus 101 and the adjustment unit 200. The image forming apparatus 101 includes a printer controller 103, an engine control portion 312, and an engine portion 140. The printer controller 103 includes a sheet library 900 and an image shape correction portion 320. The printer controller 103 is electrically connected to the operation portion 180, the engine control portion 312, and a communication portion 250 of the adjustment unit 200. The engine control portion 312 is electrically connected to a conveyance roller drive motor 311 and a flapper drive portion 141. The flapper drive portion 141 is configured to drive flappers 131, 132, 133, and 134. The engine control portion 312 is further electrically connected to a first post-fixing sensor 153, a second post-fixing sensor 163, a surface reverse sensor 137, and the engine portion 140. The engine control portion 312 is configured to control the engine portion 140 to execute the image forming process (including sheet feeding processing). The engine portion 140 includes a yellow image forming portion 120, a magenta image forming portion 121, a cyan image forming portion 122, and a black image forming portion 123. The engine portion 140 further includes a feed cassette 113, an intermediate transfer member 106, a secondary transfer roller 114, a first fixing device 150, and a second fixing device 160.

The yellow image forming portion 120 is configured to form a yellow (Y) toner image. The magenta image forming portion 121 is configured to form a magenta (M) toner image. The cyan image forming portion 122 is configured to form a cyan (C) toner image. The black image forming portion 123 is configured to form a black (K) toner image. The yellow image forming portion 120, the magenta image forming portion 121, the cyan image forming portion 122, and the black image forming portion 123 have substantially the same structure except for their toner colors, and hence the following description is directed to the yellow image forming portion 120.

The yellow image forming portion 120 includes a photosensitive drum 105 configured to rotate. A charging device 111, a laser scanner 107, a developing device 112, and a primary transfer roller 118 are arranged around the photosensitive drum 105. The charging device 111 is configured to uniformly charge a surface of the photosensitive drum 105. The laser scanner 107 includes a laser driver (not shown) configured to turn on and off laser light emitted from a semiconductor laser 108 based on image data supplied from the printer controller 103. The laser light emitted from the semiconductor laser 108 is deflected in a main scanning direction by a rotary polygon mirror (not shown). The laser light deflected in the main scanning direction is guided to the surface of the photosensitive drum 105 by a reflecting mirror 109 to expose the uniformly charged surface of the photosensitive drum 105 in the main scanning direction. Thus, an electrostatic latent image is formed on the surface of the photosensitive drum 105 based on the image data.

The developing device 112 is configured to develop the electrostatic latent image on the surface of the photosensitive drum 105 with the yellow (Y) toner to form the yellow (Y) toner image. A voltage having a polarity reverse to that of the toner image is applied to the primary transfer roller 118 to transfer the yellow (Y) toner image on the surface of the photosensitive drum 105 onto the intermediate transfer member 106. In the same manner, the magenta (M) toner image, the cyan (C) toner image, and the black (K) toner image that are formed by the magenta image forming portion 121, the cyan image forming portion 122, and the black image forming portion 123, respectively, are sequentially transferred onto the intermediate transfer member 106. The yellow (Y) toner image, the magenta (M) toner image, the cyan (C) toner image, and the black (K) toner image are transferred onto the intermediate transfer member 106 so as to be superimposed on each other, to thereby form a full-color toner image.

Meanwhile, the sheets P stored in the feed cassette 113 are conveyed to the secondary transfer roller 114 one by one. The secondary transfer roller 114 brings the sheet P into press contact against the intermediate transfer member 106, and at the same time, a bias having a polarity reverse to that of the toner is applied to the secondary transfer roller 114. The secondary transfer roller 114 transfers the toner image on the intermediate transfer member 106 to the sheet P. The photosensitive drum 105 and the developing device 112 are attachable and removable. A feed timing sensor 116 for adjusting a timing to feed the sheet P is arranged on a conveyance path for the sheet before the secondary transfer roller 114. An image formation start position detection sensor 115 for determining a print start position when the image formation is to be performed and a density sensor 117 for measuring the density of a patch image during density control are arranged around the intermediate transfer member 106. When the density control is to be performed, the density of each patch image is measured by the density sensor 117.

The image forming apparatus 101 includes the first fixing device 150 and the second fixing device 160 each configured to heat and pressurize the toner image transferred to the sheet P to fix the toner image to the sheet P. The first fixing device 150 includes a fixing roller 151 including an internal heater, a pressure belt 152 configured to bring the sheet P into press contact against the fixing roller 151, and the first post-fixing sensor 153 configured to detect the completion of the fixing. The fixing roller 151 and the pressure belt 152 fix the toner image to the sheet P by heating and pressurizing the sheet P while nipping the sheet P, and simultaneously convey the sheet P. The second fixing device 160 is arranged on downstream of the first fixing device 150 in a conveyance direction of the sheet P. The second fixing device 160 is provided to increase the gloss of the image fixed to the sheet P by the first fixing device 150 and to ensure the fixability. The second fixing device 160 includes a fixing roller 161, a pressure roller 162, and the second post-fixing sensor 163.

The second fixing device 160 is not required to be used depending on the type of the sheet P. In this case, for the purpose of reducing an energy consumption amount, the sheet P is conveyed to a conveyance path 130 without passing through the second fixing device 160. The flapper 131 switches a conveyance destination of the sheet P between the second fixing device 160 and the conveyance path 130. The flapper 132 switches the conveyance destination of the sheet P between a conveyance path 135 and a discharge path 139. For example, in a face-up discharge mode, the flapper 132 switches the conveyance destination of the sheet P to the discharge path 139 in order to convey the sheet P having an image formed on its first surface to the discharge path 139. For example, in a face-down discharge mode, the flapper 132 switches the conveyance destination of the sheet P to the conveyance path 135 in order to convey the sheet P having the image formed on the first surface to the conveyance path 135. When a trailing end of the sheet P passes through the flapper 134, the conveyance direction of the sheet P is reversed, and the conveyance destination of the sheet P is switched to the discharge path 139 by the flapper 134.

For example, in a double-sided printing mode, in order to print a chart for adjustment on a second surface of the sheet P after a chart for adjustment has been printed on the first surface of the sheet P, the flapper 132 switches the conveyance destination of the sheet P to the conveyance path 135. The sheet P conveyed to the conveyance path 135 is conveyed to a reversing portion 136. The sheet P conveyed to the reversing portion 136 has the trailing end of the sheet P detected by the surface reverse sensor 137, and then has the conveyance direction of the sheet P reversed. The flapper 133 switches the conveyance destination of the sheet P to a conveyance path 138. Thus, the front side and the back side of the sheet P are reversed. The sheet P is conveyed from the conveyance path 138 to a secondary transfer nip formed between the intermediate transfer member 106 and the secondary transfer roller 114. The chart for adjustment is transferred to the second surface of the sheet at the secondary transfer nip. The sheet P having the charts for adjustment printed on both sides is conveyed from the discharge path 139 to the adjustment unit 200.

(Adjustment Unit)

Figure 3:
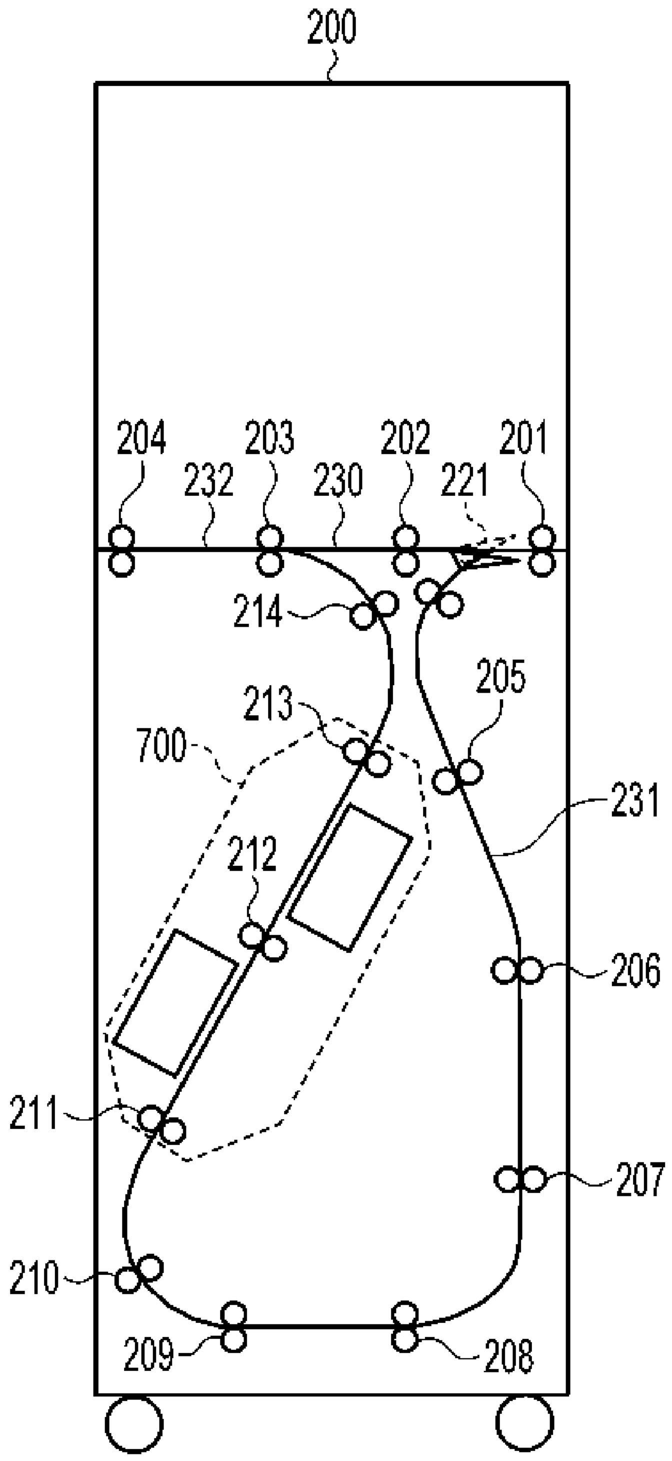
FIG. 3 is a cross-sectional view of the adjustment unit.

The adjustment unit 200 is arranged on downstream of the image forming apparatus 101 in the conveyance direction of the sheet P. FIG. 3 is a cross-sectional view of the adjustment unit 200. The adjustment unit 200 includes a through pass 230, a measurement path 231 diverted downward, and a discharge path 232 for discharging the sheet from the through pass 230 or the measurement path 231 to the post-processing apparatus 600 arranged on downstream of the adjustment unit 200. The measurement path 231 is provided with a front/back registration portion (image reading apparatus) 700 serving as a measurement portion configured to perform front/back registration for reading the charts for adjustment formed on both sides of the sheet P. The adjustment unit 200 includes a flapper 221 configured to switch the conveyance destination of the sheet P between the through pass 230 and the measurement path 231.

When the front/back registration is not to be performed by the front/back registration portion 700, the flapper 221 waits in a downward state for switching the conveyance destination of the sheet P to the through pass 230. The adjustment unit 200 receives the sheet P from the image forming apparatus 101, and conveys the sheet P to the through pass 230 by first conveyance rollers 201. The sheet P is conveyed from the through pass 230 to the discharge path 232 by second conveyance rollers 202 and third conveyance rollers 203. The sheet P is discharged to the post-processing apparatus 600 by fourth conveyance rollers 204.

Meanwhile, when the front/back registration is to be performed by the front/back registration portion 700, the flapper 221 waits in an upward state for switching the conveyance destination of the sheet P to the measurement path 231. The adjustment unit 200 receives the sheet P from the image forming apparatus 101, and conveys the sheet P to the measurement path 231 by the first conveyance rollers 201. The sheet P is conveyed to the front/back registration portion 700 by conveyance roller pairs 205, 206, 207, 208, 209, and 210. The front/back registration portion 700 reads the charts for adjustment formed on both sides of the sheet P while conveying the sheet P by conveyance roller pairs 211, 212, and 213 serving as a conveyance unit. The sheet P is conveyed to the discharge path 232 by a conveyance roller pair 214, and is discharged to the post-processing apparatus 600 by the fourth conveyance rollers 204.

As illustrated in FIG. 2, the adjustment unit 200 includes the communication portion 250, an image processing portion 260, and a control portion (control unit) 251. The communication portion 250 is electrically connected to the image processing portion 260 and the control portion 251. The communication portion 250 is electrically connected to the printer controller 103 of the image forming apparatus 101. The adjustment unit 200 further includes a conveyance motor 252, a conveyance path sensor 253, a flapper switching motor 240, a backing motor 801, a gap switching motor 802, a gap switching sensor 803, an image sensor 701, and an image sensor 702. The conveyance motor 252, the conveyance path sensor 253, the flapper switching motor 240, the backing motor 801, the gap switching motor 802, the gap switching sensor 803, the image sensor 701, and the image sensor 702 are electrically connected to the control portion 251. The image processing portion 260 is electrically connected to the image sensor 701 and the image sensor 702 serving as a reading unit. The engine control portion (first control unit) 312 controls a geometric characteristic of the image formed on the recording medium by the image forming apparatus 101 based on images read by the image sensor 701 and the image sensor 702.

(Front/Back Registration Portion)

Figure 4:
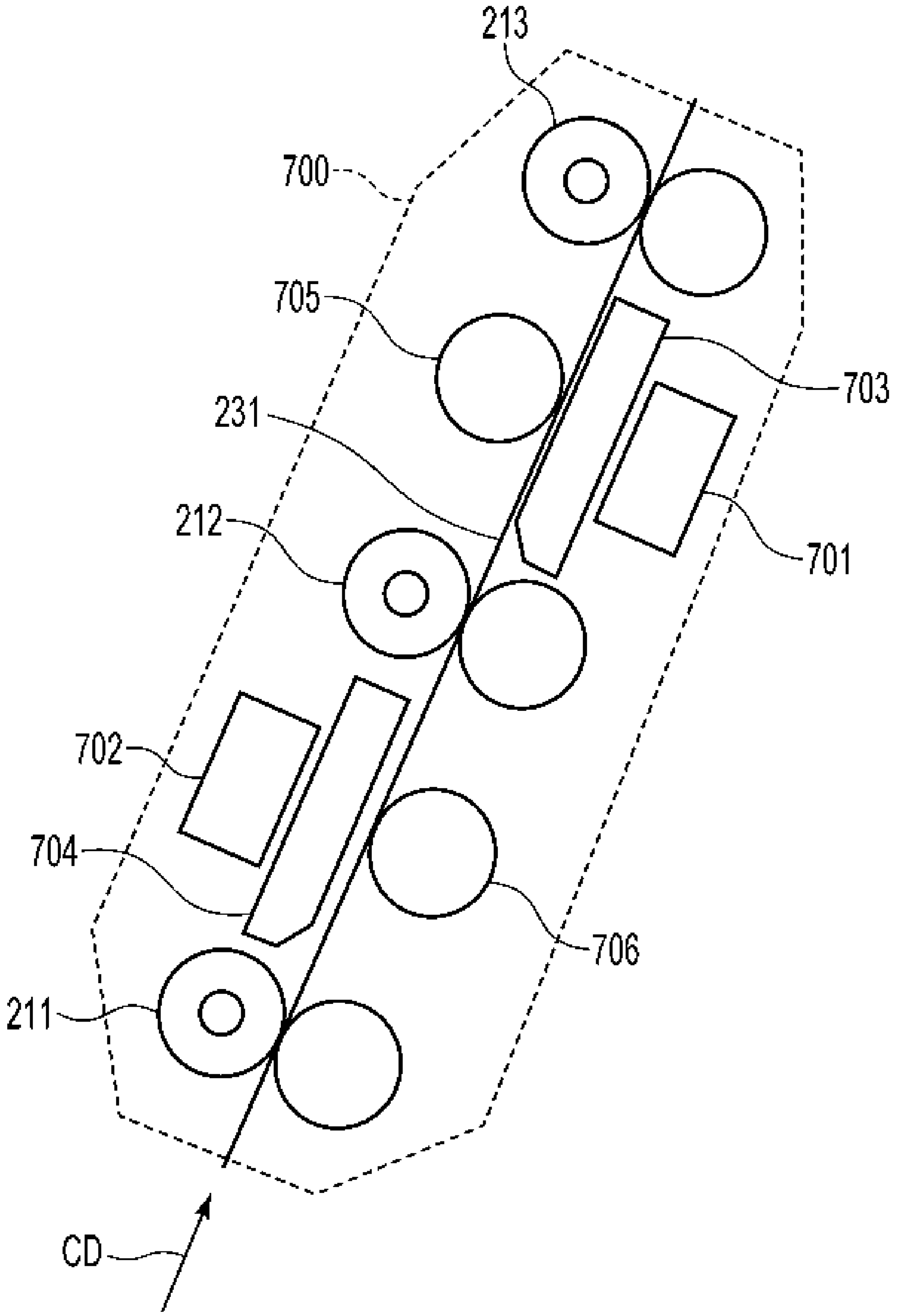
FIG. 4 is a view for illustrating a front/back registration portion.

A structure of the front/back registration portion 700 is described with reference to FIG. 4. FIG. 4 is a view for illustrating the front/back registration portion 700. The front/back registration portion 700 is configured to measure a shape of the sheet, shapes of image patterns printed on the sheet, and a positional relationship between the image patterns. In order to obtain a highly accurate measurement result, it is required to average shape variations and print position variations for each sheet, and hence a plurality of sheets are measured. In order to shorten an adjustment time for measuring the plurality of sheets, the front/back registration portion 700 performs the measurement while conveying the sheets. In addition, a size of the front/back registration portion 700 is preferred to be as small as possible, and hence the front/back registration portion 700 uses the image sensor 701 and the image sensor 702 that are contact image sensors (CISs).

The image sensor (hereinafter referred to as "front-side CIS") 701 serving as the reading unit is configured to read the front side of the sheet. The image sensor (hereinafter referred to as "back-side CIS") 702 serving as the reading unit is configured to read the back side of the sheet. The front-side CIS 701 is arranged on one side of the measurement path 231. The back-side CIS 702 is arranged on another side of the measurement path 231. The front-side CIS 701 is arranged so as to be opposed to the measurement path 231 via a reading glass (light transmitting member) 703 serving as a transparent member. A backing roller 705 serving as a reference member is arranged on the another side of the measurement path 231 so as to be opposed to the reading glass (glass plate) 703. The back-side CIS 702 is arranged so as to be opposed to the measurement path 231 via a reading glass (light transmitting member) 704 serving as the transparent member. A backing roller 706 is arranged on the one side of the measurement path 231 so as to be opposed to the reading glass 704.

The sheet is conveyed in a conveyance direction CD. The conveyance roller pairs (conveyance units) 211, 212, and 213 are configured to convey the sheet at a stable conveyance speed. The conveyance roller pairs 211, 212, and 213 are driven by the conveyance motor (drive unit) 252. The reading glasses 703 and 704 function as a guide member configured to guide movement of the sheet in order to stabilize the position of the sheet in a depth-of-focus direction (thickness direction of the sheet) of the front-side CIS 701 and the back-side CIS 702. The backing rollers 705 and 706 each have a black surface in order to clarify a contrast with an end portion of the sheet.

(Backing Roller)

Figure 5:
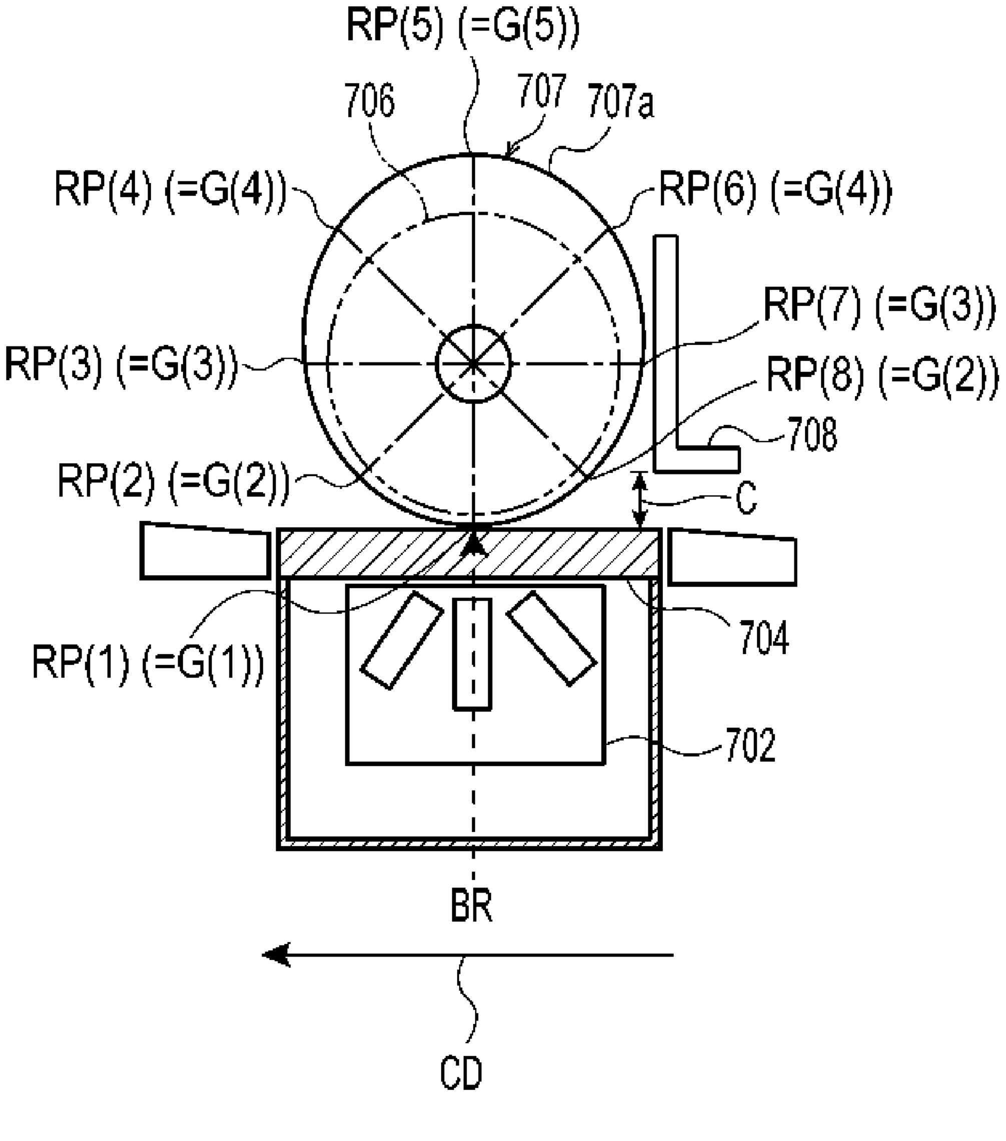
FIG. 5 is a cross-sectional view of a back-side CIS taken along a conveyance direction.
Figure 6:
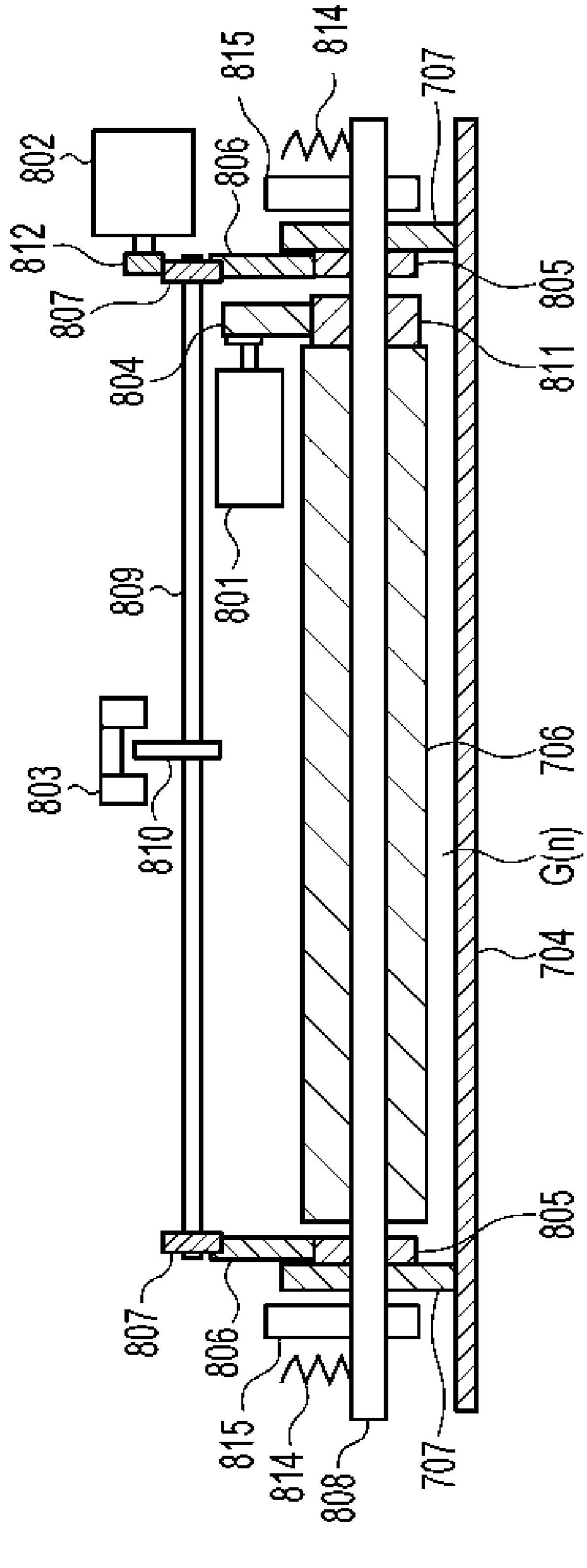
FIG. 6 is a cross-sectional view of a backing roller as viewed along the conveyance direction.

With reference to FIG. 5 and FIG. 6, the back-side CIS 702 and the backing roller 706 are described. The front-side CIS 701 and the backing roller 705 have structures similar to those of the back-side CIS 702 and the backing roller 706, and hence description thereof is omitted here. FIG. 5 is a cross-sectional view of the back-side CIS 702 taken along the conveyance direction CD. FIG. 6 is a cross-sectional view of the backing roller 706 as viewed along the conveyance direction CD. The reading glass 704 is arranged directly above the back-side CIS 702. The backing roller 706 is arranged so as to be opposed to the reading glass 704 at a reading position BR, to thereby form a gap G(n) through which the sheet conveyed by the conveyance roller pair 211 passes. The sheet is conveyed through the gap G(n) between the reading glass 704 and the backing roller 706 (long dashed double-short dashed line). The size of the gap G(n) can be changed in accordance with the thickness of the sheet.

On the upstream of the backing roller 706 in the conveyance direction CD, a conveyance guide 708 is arranged. The conveyance guide 708 is configured to guide the sheet to the reading position BR without causing the sheet to be uncontrolled. The sheet enters a clearance (gap) C between the reading glass 704 and the conveyance guide 708. With the conveyance guide 708 guiding the sheet, the reading accuracy by the back-side CIS 702 at the reading position BR can be improved, and jamming of the sheet at the clearance C can be avoided. The clearance C can also be changed in accordance with the thickness of the sheet, similarly to the gap G(n). The clearance C is preferred to be larger than the gap G(n) to be set within a focal range of the back-side CIS 702. In order to change the gap G(n) and the clearance C, at both end portions in an axial direction of the backing roller 706, abutment members (cam members) 707 are arranged. The abutment members (cam members) 707 serve as a changing unit configured to change the size of the gap G(n). The abutment members 707 are brought into abutment against the reading glass 704 by biasing members, for example, springs 814 (FIG. 6).

Each of the abutment members 707 is rotatably supported on a shaft (rotary shaft) 808. The backing roller 706 is rotatably supported on the shaft 808. An outer peripheral portion of the abutment member 707 has an eccentric shape. An eccentric shaft of the abutment member 707 is rotatably supported coaxially with the rotary shaft of the backing roller 706. When the abutment member 707 is rotated in a state in which an outer peripheral surface (abutment surface) 707*a* of the abutment member 707 abuts against a surface (reference surface) of the reading glass 704, the distance between the shaft 808 and the reading glass 704 is changed. In this manner, the distance between the backing roller 706 and the reading glass 704 in the depth-of-focus direction of the back-side CIS 702 is changed. In this embodiment, the outer peripheral surface 707*a* of the abutment member 707 abuts against the surface of the reading glass 704. However, this embodiment is not limited thereto. The outer peripheral surface 707*a* of the abutment member 707 may abut against other members of the front/back registration portion 700, for example, a surface (reference surface) of a support member configured to support the reading glass 704. The shaft (rotary shaft) 808 rotatably supporting the backing roller 706 is held by a holding member 815. The holding member 815 is configured to integrally hold the conveyance guide 708, and hence the position of the conveyance guide 708 is also adjusted in association with the adjustment of the gap G(n). In this manner, the reading accuracy can be improved with respect to various sheet thicknesses, and jamming of the sheet can be avoided.

When the abutment member 707 is rotated to be held at each rotation position RP, the gap G(n) can be switched at five stages of G(1), G(2), G(3), G(4), and G(5). Rotation positions RP(1), RP(2), RP(3), RP(4), RP(5), RP(6), RP(7), and RP(8) correspond to the gaps G(1), G(2), G(3), G(4), G(5), G(4), G(3), and G(2), respectively. The gap G(n) has the following relationship.

$$G(1)<G(2)<G(3)<G(4)<G(5)$$

Further, the conveyance guide 708 is configured to rotatably hold the shaft 808 of the backing roller 706. At the same time as when the abutment member 707 is rotated to switch the gap G(n), the clearance C(n) can also be switched at five stages of C(1), C(2), C(3), C(4), and C(5). The rotation positions RP(1), RP(2), RP(3), RP(4), RP(5), RP(6), RP(7), and RP(8) correspond to the clearances C(1), C(2), C(3), C(4), C(5), C(4), C(3), and C(2), respectively. The clearance C(n) has the following relationship.

$$C(1)<C(2)<C(3)<C(4)<C(5)$$

The abutment member 707 is configured to rotate by receiving drive from the gap switching motor 802 serving as a driving source via drive connection gears 812, 807, 806, and 805. The abutment member 707 is stopped to rotate and is held at the rotation position RP(n) corresponding to the set gap G(n). The drive of the gap switching motor 802 is transmitted to the abutment members 707 on both axial sides by a drive transmitting shaft 809, and hence the abutment members 707 on both the axial sides are held to form the same gap G(n). The rotation position RP of the abutment member 707 is detected based on a detection result obtained by the gap switching sensor 803 configured to detect a sensor flag 810 arranged on the drive transmitting shaft 809. The switching of the gap G(n) is controlled based on the detection result obtained by the gap switching sensor 803. In this embodiment, the gap G(n) is switched at five stages. The control portion (second control unit) 251 is configured to control the rotation of the abutment member 707 so that the size of the gap G(n) becomes a first size when the thickness of the sheet conveyed by the conveyance roller pair 211 is a first thickness. The control portion 251 is further configured to control the rotation of the abutment member 707 so that the size of the gap G(n) becomes a second size larger than the first size, when the thickness of the sheet conveyed by the conveyance roller pair 211 is a second thickness larger than the first thickness.

Meanwhile, the backing roller 706 is configured to rotate in association with the movement of the sheet. The backing roller 706 is configured to receive drive from the backing motor 801 serving as a driving source different from the driving source of the abutment member 707, to thereby rotate at the same peripheral speed as the sheet conveyance speed. The drive of the backing motor 801 is transmitted to the backing roller 706 via a motor pulley, a timing belt 804, and a backing drive pulley 811. The peripheral speed of the backing roller 706 is the same as the sheet reading speed. Thus, the image of the sheet is not rubbed by the backing roller 706, and the dirt on the reading glass 704 and its surrounding is reduced.

Figure 7:
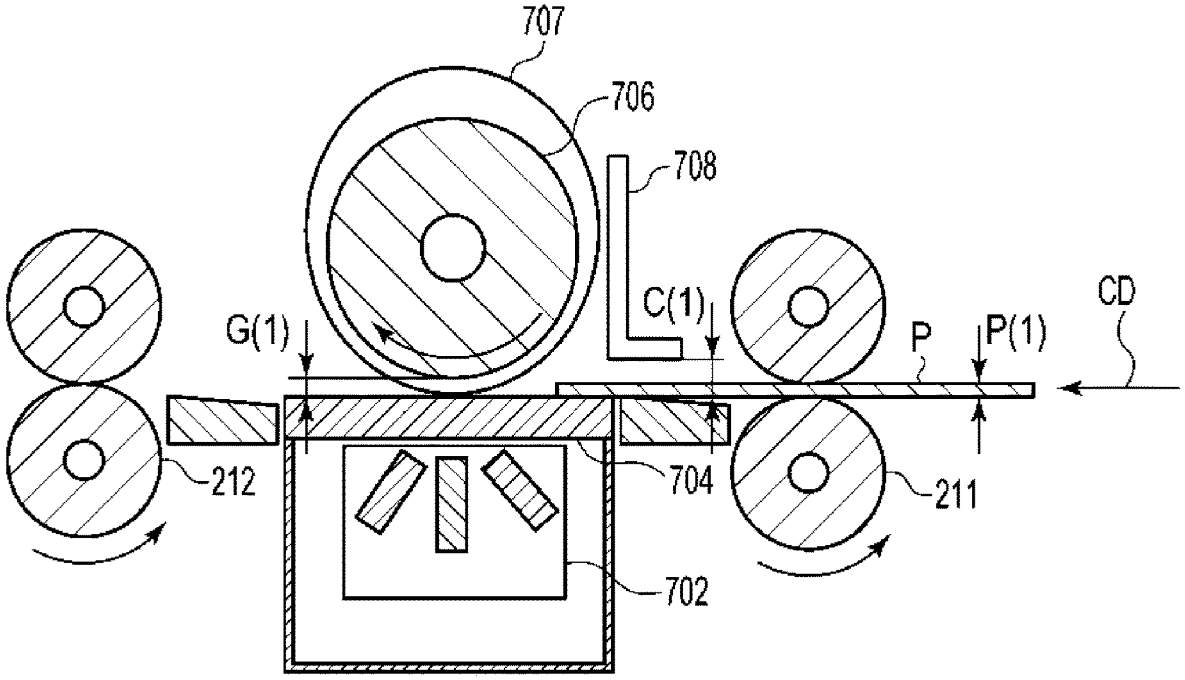
FIG. 7 is an explanatory view for illustrating reading of a thin sheet.
Figure 8:
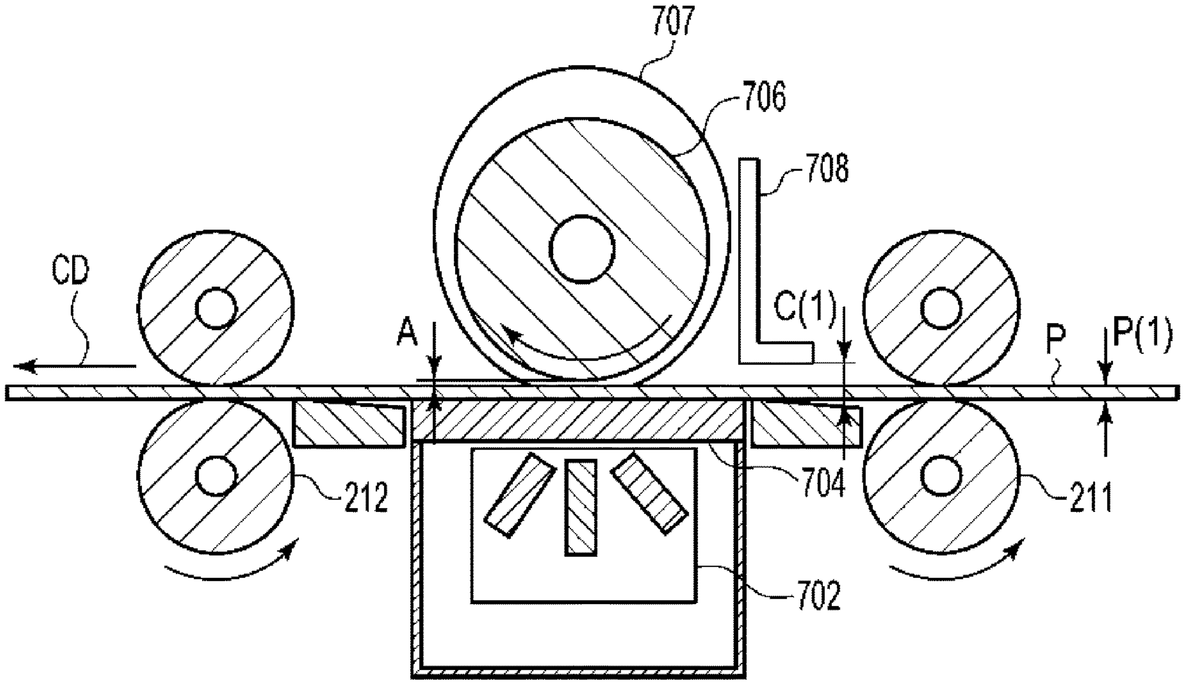
FIG. 8 is an explanatory view for illustrating the reading of the thin sheet.

With reference to FIG. 7 and FIG. 8, a reading conveyance state when the thickness of the sheet P is small is described. FIG. 7 and FIG. 8 are explanatory views for illustrating reading of a thin sheet P(1). In a case of the thin sheet P(1) having a small thickness, the gap G is set to G(1), and the clearance C is set to C(1). The abutment member 707 is rotated until, and stopped and held at, the rotation position RP(1) corresponding to the gap G(1) based on the detection result obtained by the gap switching sensor (backing roller position sensor) 803. The conveyance roller pairs 211 and 212 are rotated in the direction of the arrows of FIG. 7 and FIG. 8, to thereby convey the sheet P(1) to the gap G(1). The backing roller 706 is rotated in the direction of the arrows of FIG. 7 and FIG. 8 at the sheet reading speed.

In this case, the gap G(1) is expressed as follows through use of the thickness of the sheet P(1) and a margin gap A.

$$\text{Gap } G(1)=(\text{Thickness of sheet } P(1))+(\text{Margin gap } A)$$

The gap G(1) guides the sheet P(1) between the reading glass 704 and the backing roller 706, and has the margin gap A provided so that an uncontrolled motion (unexpected motion) of the sheet P(1) in a focal direction of the back-side CIS 702 can be reduced. Further, the clearance C(1) is also set to an amount corresponding to the thickness of the sheet P(1), and hence the sheet P(1) can be conveyed to the back-side CIS 702 while the uncontrolled motion of the sheet P(1) is reduced.

Figure 9:
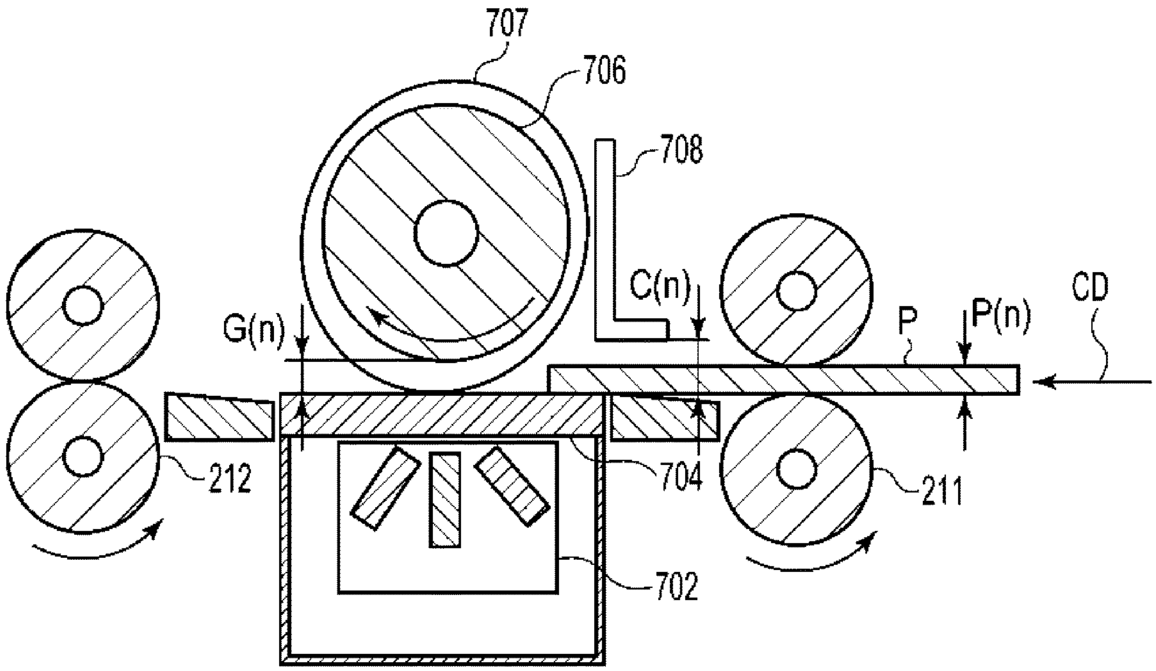
FIG. 9 is an explanatory view for illustrating reading of a thick sheet.
Figure 10:
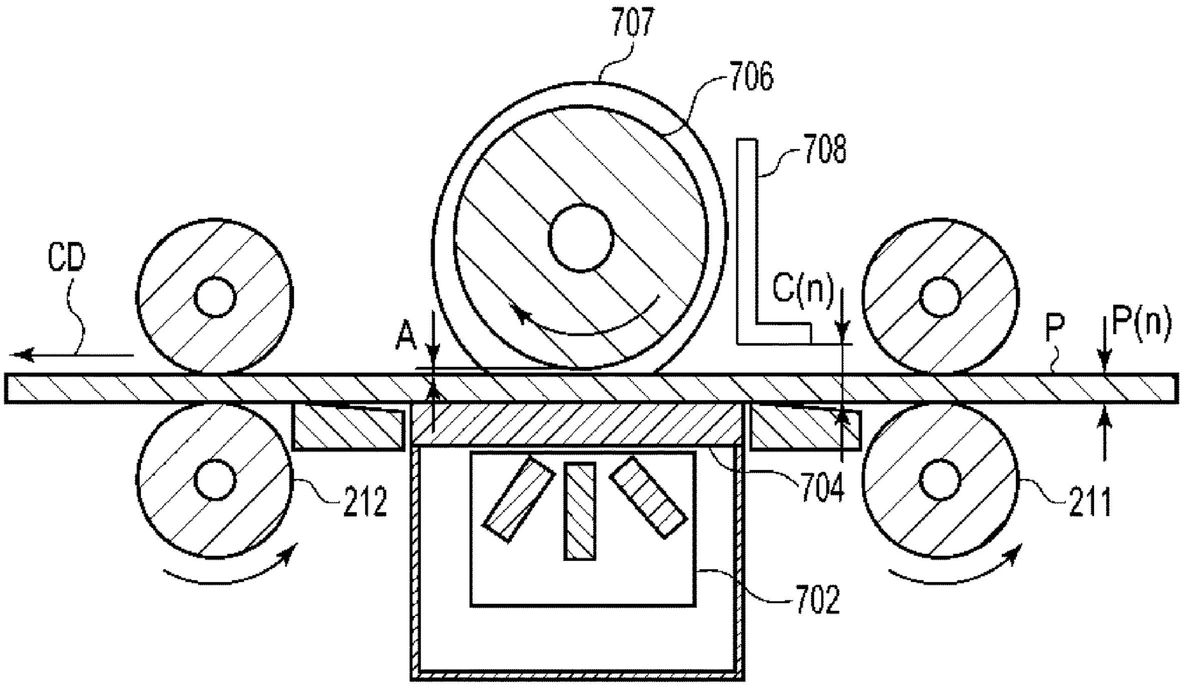
FIG. 10 is an explanatory view for illustrating the reading of the thick sheet.

With reference to FIG. 9 and FIG. 10, a reading conveyance state when the thickness of the sheet P is large is described. FIG. 9 and FIG. 10 are explanatory views for illustrating reading of a thick sheet P(n). In a case of the thick sheet P(n) having a large thickness, the gap G is set to G(n), and the clearance C is set to C(n). The abutment member 707 is rotated until, and stopped and held at, the rotation position RP corresponding to the gap G(n) based on the detection result obtained by the gap switching sensor 803. The conveyance roller pairs 211 and 212 are rotated in the direction of the arrows of FIG. 9 and FIG. 10, to thereby convey the sheet P(n) to the gap G(n). The backing roller 706 is rotated in the direction of the arrows of FIG. 9 and FIG. 10 at the sheet reading speed.

In this case, the gap G(n) is expressed as follows through use of the thickness of the sheet P(n) and the margin gap A.

$$\text{Gap } G(n)=(\text{Thickness of sheet } P(n))+(\text{Margin gap } A)$$

The gap G(n) guides the sheet P(n) between the reading glass 704 and the backing roller 706, and has the margin gap A provided so that an uncontrolled motion (unexpected motion) of the sheet P(n) in the focal direction of the back-side CIS 702 can be reduced. Further, the clearance C(n) is also set to an amount corresponding to the thickness of the sheet P(n), and hence the sheet P(n) can be conveyed to the back-side CIS 702 while the uncontrolled motion of the sheet P(n) is reduced.

Figures 11, 12A:
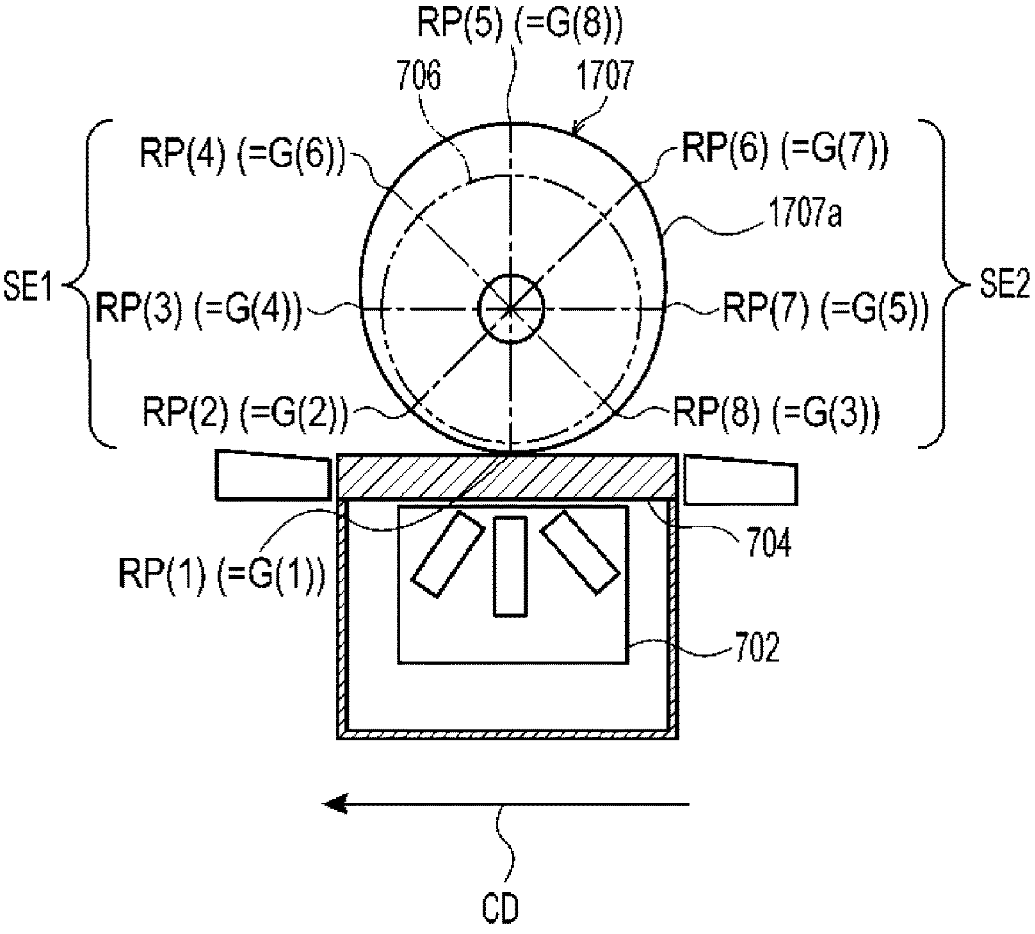
FIG. 11 is a diagram for showing a gap switching table.
FIG. 12A is a view for illustrating a modification example of an abutment member.

FIG. 11 is a diagram for showing the gap switching table. As shown in FIG. 11, in this embodiment, a basis weight BW of the sheet P is set in a range of from 52 g/m$^2$ to 400 g/m$^2$. As shown in FIG. 11, the thickness of the sheet P is from 0.15 mm to 0.50 mm. The margin gap A is set in a range of from 0.20 mm to 0.40 mm. For example, for the sheet P(1) having the basis weight BW of 150 g/m$^2$ or less, the rotation position RP of the abutment member 707 is set to the gap G(1). The amount of the gap G(1) is 0.35 mm, and the clearance C is 2.15 mm. For example, for the sheet P(4) having the basis weight BW more than 300 g/m$^2$ and equal to or less than 400 g/m$^2$, the rotation position RP of the abutment member 707 is set to the gap G(4). The amount of the gap G(4) is 0.90 mm, and the clearance C is 2.70 mm. When the reading of the sheet P is not executed, the rotation position RP of the abutment member 707 is set to the gap G(5). The amount of the gap G(5) is 1.20 mm, and the clearance C is 3.00 mm. In this embodiment, as shown in FIG. 11, the gap G can be set at five stages. The basis weight BW and the thickness of the sheet approximately correspond to each other, and the thickness is increased as the basis weight BW is increased. However, there is an exception depending on the sheet type. The numerical values of FIG. 11 are merely examples, and this embodiment is not limited thereto.

(Modification Examples of Abutment Member)

Figure 12B:
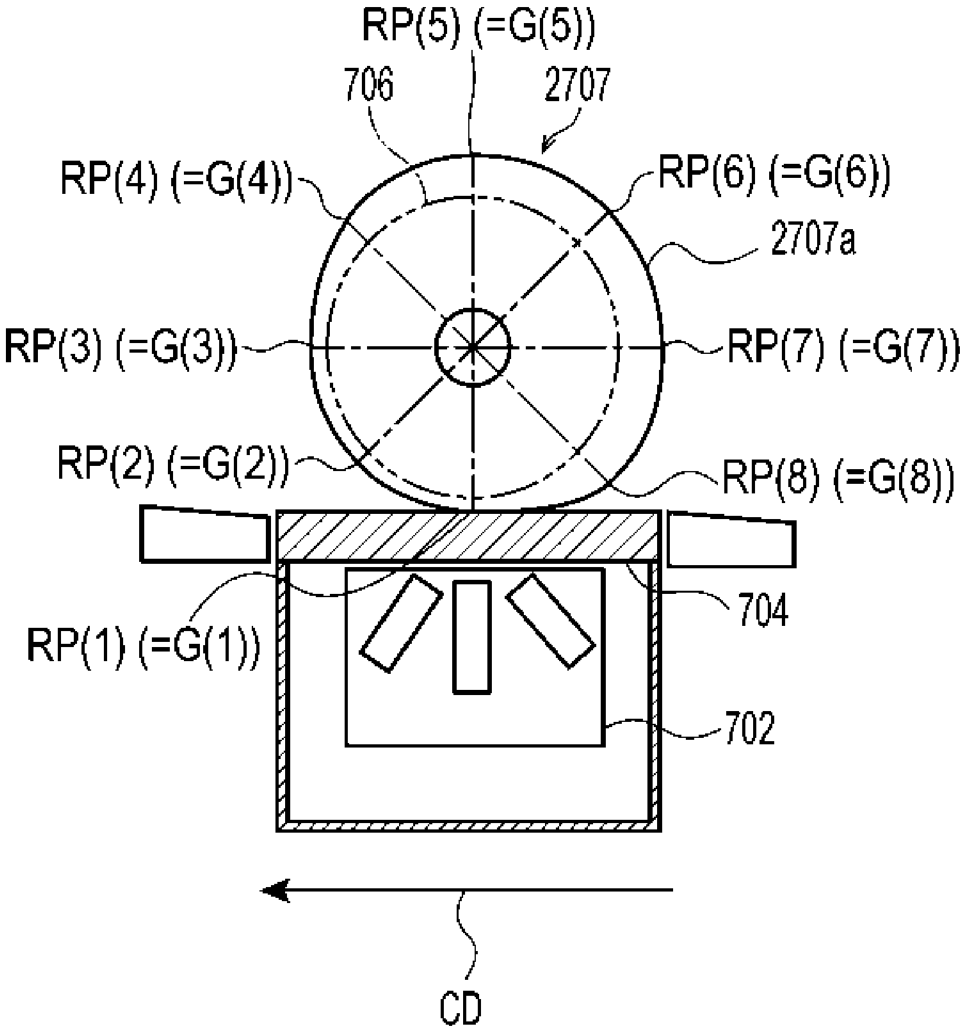
FIG. 12B is a view for illustrating another modification example of the abutment member.

In this embodiment, the gap G(n) is switched at five stages, but the present invention is not limited thereto. The gap G(n) may be switched at four stages or less, or may be switched at six stages or more. In this embodiment, the abutment member 707 is formed to have a bisymmetrical shape, but the present invention is not limited thereto. For example, FIG. 12A and FIG. 12B are views for illustrating modification examples of the abutment member. FIG. 12A is a cross-sectional view of an abutment member 1707 in the modification example. The outer peripheral portion of the abutment member 1707 has an eccentric shape. An eccentric shaft of the abutment member 1707 is rotatably supported coaxially with the rotary shaft of the backing roller 706.

When the abutment member 1707 is rotated to be held at each rotation position RP, the gap G(n) can be switched at eight stages of G(1), G(2), G(3), G(4), G(5), G(6), G(7), and G(8). The rotation positions RP(1), RP(2), RP(3), RP(4), RP(5), RP(6), RP(7), and RP(8) correspond to the gaps G(1), G(2), G(4), G(6), G(8), G(7), G(5), and G(3), respectively. The gap G(n) has the following relationship.

$$G(1)<G(2)<G(3)<G(4)<G(5)<G(6)<G(7)<G(8)$$

On an outer peripheral surface (abutment surface) 1707*a* of the abutment member 1707, as illustrated in FIG. 12A, the maximum gap G(8) is arranged so as to be opposed at 180 degrees to the minimum gap G(1). The gaps G(2), G(3), G(4), G(5), G(6), and G(7) are alternately arranged between the maximum gap G(8) and the minimum gap G(1). This arrangement is for suppressing the load to be applied to the backing motor 801 when the gap G(n) is switched. In the modification example illustrated in FIG. 12A, the maximum gap G(8) (maximum value) is taken at the rotation position (first rotation position) RP(5), and the minimum gap G(1) (minimum value) is taken at the rotation position (second rotation position) RP(1). The abutment surface of the abutment member 1707 to be brought into abutment against the reading glass 704 at the rotation position RP(5) at which the maximum gap G(8) is taken is arranged so as to be opposed at 180 degrees to the abutment surface of the abutment member 1707 to be brought into abutment against the reading glass 704 at the rotation position RP(1) at which the minimum gap G(1) is taken.

In this modification example, the plurality of rotation positions RP(1), RP(2), RP(3), RP(4), RP(5), RP(6), RP(7), and RP(8) are arranged at equiangular intervals. However, the plurality of rotation positions RP may be arranged at freely-set angular intervals instead of equiangular intervals. In this modification example, as illustrated in FIG. 12A, the rotation positions RP(2), RP(3), and RP(4) are arranged on a first side SE1 from the rotation position (second rotation position) RP(1) to the rotation position (first rotation position) RP(5). The rotation positions RP(6), RP(7), and RP(8) are arranged on a second side SE2 from the rotation position (first rotation position) RP(5) to the rotation position (second rotation position) RP(1). The plurality of rotation positions RP are alternately arranged in the ascending order of the plurality of gaps G(n) on the first side SE1 and on the second side SE2 opposite to the first side SE1.

FIG. 12B is a cross-sectional view of an abutment member 2707 according to another modification example. For example, when an outer peripheral surface (abutment surface) 2707*a* of the abutment member 2707 is formed as illustrated in FIG. 12B, the maximum gap G(8) and the minimum gap G(1) have a positional relationship of being adjacent to each other. The outer peripheral surface 2707*a* of the abutment member 2707 between the minimum gap G(1) and the maximum gap G(8) becomes a steep surface, and hence the load to be applied to the backing motor 801 is increased when the gap G(n) is switched. Accordingly, the motor is required to be increased in size, which leads to increase in cost.

FIG. 13 is a diagram for showing a gap switching table for the abutment member 1707 in the modification example. The basis weight BW of the sheet Pin a case in which the abutment member 1707 in the modification example illustrated in FIG. 12A is used is set in a range of from 52 g/m$^2$ to 450 g/m$^2$. As shown in FIG. 13, the thickness of the sheet P is from 0.15 mm to 0.60 mm. The margin gap A is set in a range of from 0.15 mm to 0.40 mm. For example, for the sheet P(1) having the basis weight BW of 100 g/m$^2$ or less, the rotation position RP of the abutment member 1707 is set to the gap G(1). The amount of the gap G(1) is 0.3 mm. For example, for the sheet P(4) having the basis weight BW more than 200 g/m$^2$ and equal to or less than 300 g/m$^2$, the rotation position RP of the abutment member 1707 is set to the gap G(4). The amount of the gap G(4) is 0.80 mm. When the reading of the sheet P is not executed, the rotation position RP of the abutment member 1707 is set to the gap G(8). The amount of the gap G(8) is 1.20 mm. When the abutment member 1707 in the modification example is used, as shown in FIG. 13, the gap G(n) is set at eight stages. The description above is about the abutment member 1707 in the modification example. Now, description is given back to the description of the case in which the abutment member 707 in this embodiment is used and the gap G(n) is set at five stages.

As described above, the gap G is expressed as follows.

Gap $G$=(Thickness of the sheet $P$)+(Margin gap $A$)

When the margin gap A is small, in particular, when the margin gap A has a negative value, the sheet P is forcibly caused to enter the gap G that is smaller than the thickness of the sheet P. Accordingly, shock vibrations to be caused when the leading edge of the sheet P enters the gap G, and a load during conveyance are increased. As a result, a conveyance unevenness is increased, and thus the jamming may occur or the reading conveyance performance may be reduced. Further, the sheet P is strongly pressed to the reading glass 704, and hence the reading glass 704 may be flawed, or the image may come off to cause dirt. Accordingly, the margin gap A is required to be set to an appropriate value. The gap G is set to be equal to or larger than the thickness of the sheet P.

Meanwhile, when the margin gap A is large, the curled sheet is liable to be in an uncontrolled motion (unexpected motion) at a reading portion between the reading glass 704 and the backing roller 706. When the back side of the sheet P separates away from a reading ensuring range in the focal direction of the back-side CIS 702, the resolution may be reduced or a flare may be caused. The back-side CIS 702 in this embodiment may cause a reading failure when the back side of the sheet P is separated away from the surface of the reading glass 704 in the focal direction by 0.5 mm or more. In view of the above, as shown in FIG. 11, the amount of the gap G and the number of stages of the rotation position RP of the abutment member 707 are set so that the margin gap A falls within a range of from 0.1 mm to 0.5 mm.

In this embodiment, a read gap amount 920 for which the gap G is set is provided in the sheet library 900 based on the gap switching table shown in FIG. 11. FIG. 14 is a table for showing the sheet library 900. In the sheet library 900, the gap G is set so as to correspond to the sheet type. When the user sets the sheet type through the operation portion 180, the gap G is automatically determined. FIG. 15 is a view for illustrating a sheet library editing screen 1001 to be displayed on the operation portion 180. The user can select a sheet type 910 from the sheet library editing screen 1001 to set the sheet type 910. When the sheet type 910 is set, the gap G is automatically set from the read gap amount 920. In this embodiment, the user sets the information on the sheet through the operation portion 180. However, for example, the information related to the thickness of the sheet may be acquired by a media sensor 142 (FIG. 1) provided on the conveyance path. The media sensor 142 is configured to detect a characteristic of the sheet. The detection result obtained by the media sensor 142 is input to the printer controller 103. The printer controller 103 serving as an acquisition unit may acquire the information related to the thickness of the sheet based on the detection result obtained by the media sensor 142.

(Feedback Configuration of Front/Back Registration)

Measurement to be performed by the front/back registration portion 700 and a feedback destination of a result of the measurement are described. When the image forming apparatus 101 receives a request from a "PRINT POSITION ADJUSTMENT" button 1002 on the sheet library editing screen 1001 illustrated in FIG. 15 through an operation performed on the operation portion 180 by the user, patch images 820 (FIG. 16A and FIG. 16B) serving as the chart for adjustment are formed on the sheet P. Further, the printer controller 103 transmits the amount of the gap G corresponding to the basis weight BW of the sheet P to the control portion 251 of the adjustment unit 200. The control portion 251 controls the gap switching motor 802 in accordance with the amount of the gap G to rotate the abutment member 707, and switches the rotation position RP of the abutment member 707 in accordance with the detection result obtained by the gap switching sensor 803.

Figure 16B:
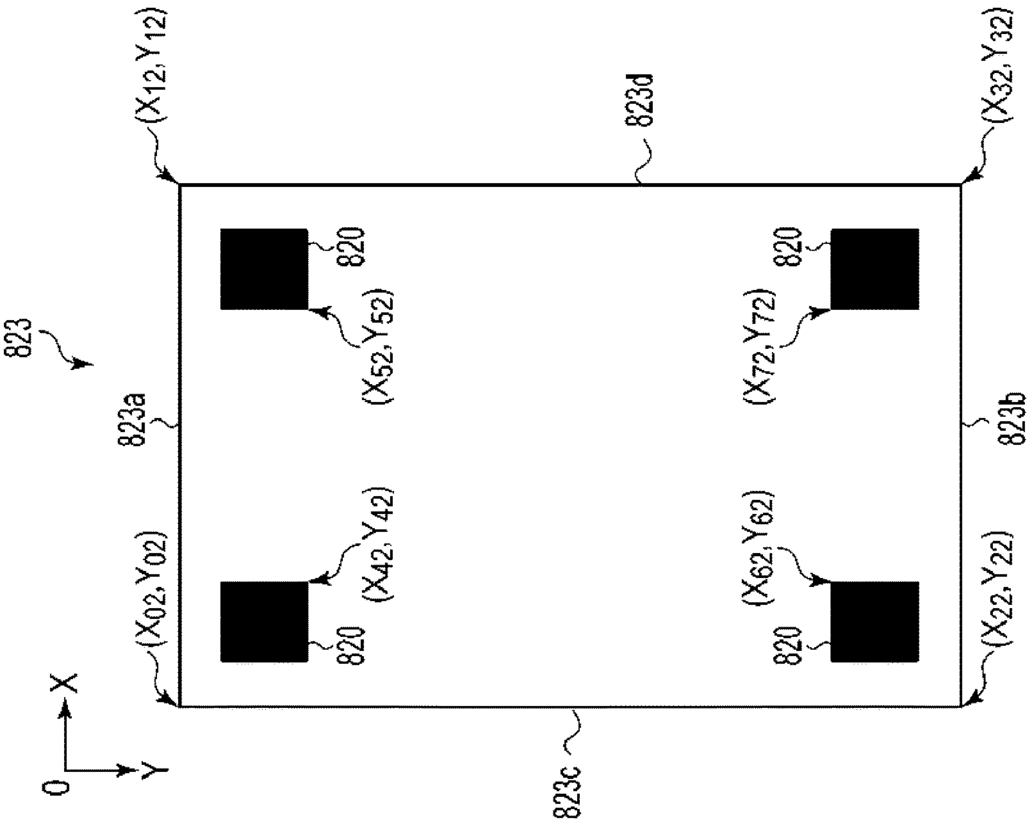
FIG. 16B is a view for illustrating patch images to be formed on a sheet.
Figure 16A:
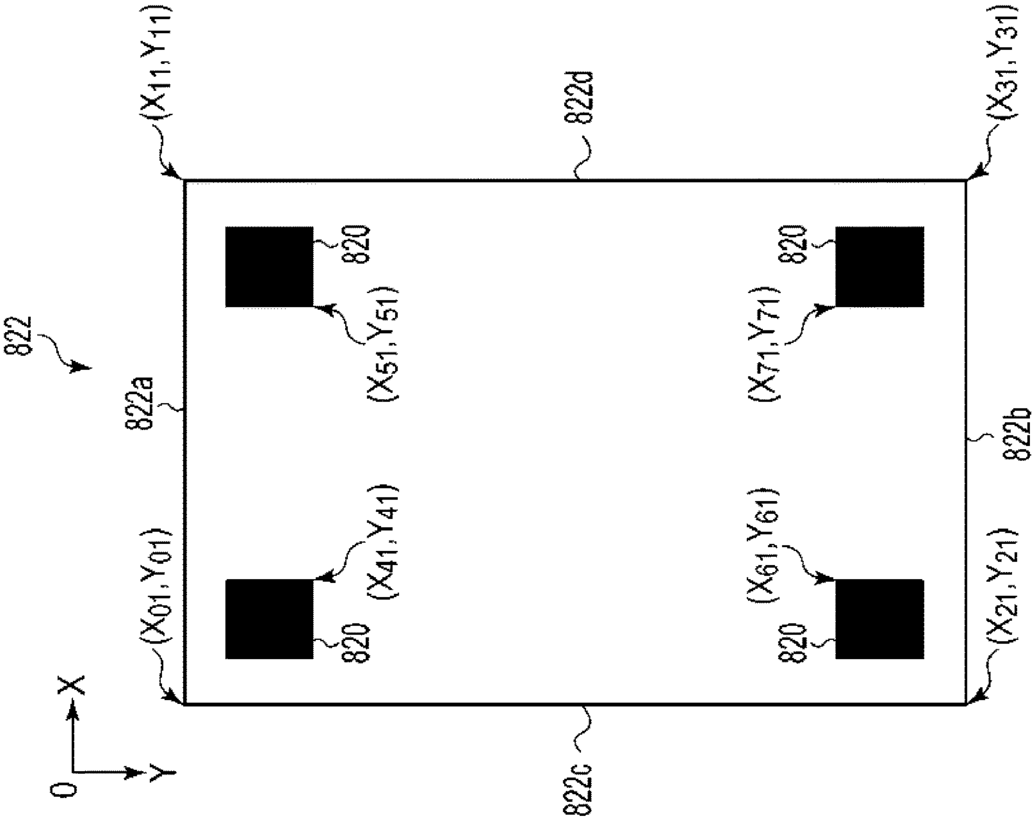
FIG. 16A is a view for illustrating patch images to be formed on a sheet.

FIG. 16A and FIG. 16B are views for illustrating the patch images 820 formed on the sheet P. The front/back registration portion 700 reads the front side and back side of the sheet P on which the patch images 820 serving as the chart for adjustment have been formed by the front-side CIS 701 and the back-side CIS 702, respectively, while conveying the sheet P by the conveyance roller pairs 211, 212, and 213. The front side and back side of the sheet P are continuously read by the front-side CIS 701 and the back-side CIS 702, respectively, and read line images are connected to combine image data. The measurement is performed based on the combined image.

FIG. 16A is a view for illustrating a front-side measurement pattern image 822 obtained by reading the front side of the sheet P on which the patch images 820 have been formed by the front-side CIS 701. The four patch images 820 are formed in the four corner areas of the front-side measurement pattern image 822. The front-side measurement pattern image 822 includes a leading edge 822_a_ and a trailing edge 822_b_ in the conveyance direction CD of the sheet P and a left-side edge 822_c_ and a right-side edge 822_d_ along the conveyance direction CD. The conveyance direction CD of the sheet P is set as the sub-scanning direction Y, and a direction perpendicular to the sub-scanning direction Y is set as the main scanning direction X.

The image processing portion 260 calculates detection coordinates $(X_{01}, Y_{01})$, $(X_{11}, Y_{11})$, $(X_{21}, Y_{21})$, and $(X_{31}, Y_{31})$ of the sheet P from the front-side measurement pattern image 822. The image processing portion 260 calculates detection coordinates $(X_{41}, Y_{41})$, $(X_{51}, Y_{51})$, $(X_{61}, Y_{61})$, and $(X_{71}, Y_{71})$ of the patch images 820 from the front-side measurement pattern image 822. The image processing portion 260 measures a distortion amount of the image on the front side and a position misregistration amount between the sheet P and the image based on the detection coordinates $(X_{01}, Y_{01})$ to $(X_{71}, Y_{71})$. The image processing portion 260 calculates a first geometric adjustment value 901 (FIG. 14), which enables shape correction instruction for the image shape correction portion 320, based on the distortion amount and the position misregistration amount of the image on the front side. The first geometric adjustment value 901 includes a lead position, a side position, a main scanning magnification, a sub-scanning magnification, a right angle property, and a rotation amount.

FIG. 16B is a view for illustrating a back-side measurement pattern image 823 obtained by reading the back side of the sheet P on which the patch images 820 have been formed by the back-side CIS 702. The four patch images 820 are formed in the four corner areas of the back-side measurement pattern image 823. The back-side measurement pattern image 823 includes a leading edge 823_a_ and a trailing edge 823_b_ in the conveyance direction CD of the sheet P and a left-side edge 823_c_ and a right-side edge 823_d_ along the conveyance direction CD.

The image processing portion 260 calculates detection coordinates $(X_{02}, Y_{02})$, $(X_{12}, Y_{12})$, $(X_{22}, Y_{22})$, and $(X_{32}, Y_{32})$ of the sheet P from the back-side measurement pattern image 823. The image processing portion 260 calculates detection coordinates $(X_{42}, Y_{42})$, $(X_{52}, Y_{52})$, $(X_{62}, Y_{62})$, and $(X_{72}, Y_{72})$ of the patch images 820 from the back-side measurement pattern image 823. The image processing portion 260 measures a distortion amount of the image on the back side and a position misregistration amount between the sheet P and the image based on the detection coordinates $(X_{02}, Y_{02})$ to $(X_{72}, Y_{72})$. The image processing portion 260 calculates a second geometric adjustment value 902 (FIG. 14), which enables shape correction instruction for the image shape correction portion 320, based on the distortion amount and the position misregistration amount of the image on the back side. The second geometric adjustment value 902 includes a lead position, a side position, a main scanning magnification, a sub-scanning magnification, a right angle property, and a rotation amount.

The first geometric adjustment value 901 and the second geometric adjustment value 902 calculated by the image processing portion 260 are transmitted to the sheet library 900 in the image forming apparatus 101 through the communication portion 250. The first geometric adjustment value 901 and the second geometric adjustment value 902 are stored in the sheet library 900 as a parameter for the front side and a parameter for the back side. In this manner, setting values are stored in the sheet library 900 for each sheet type 910. A print image with the front and back print positions corrected with high accuracy can be output by reading the setting values based on the sheet type 910 of a sheet on which a print job is to be executed and correcting the image position and image distortion. In this case, the front-side measurement pattern image 822 and the back-side measurement pattern image 823 which have been exemplified in this description may be measured before the execution of the print job, or may be automatically measured at a predetermined timing as calibration during the execution of the print job.

(Control Operation)

Figure 17:
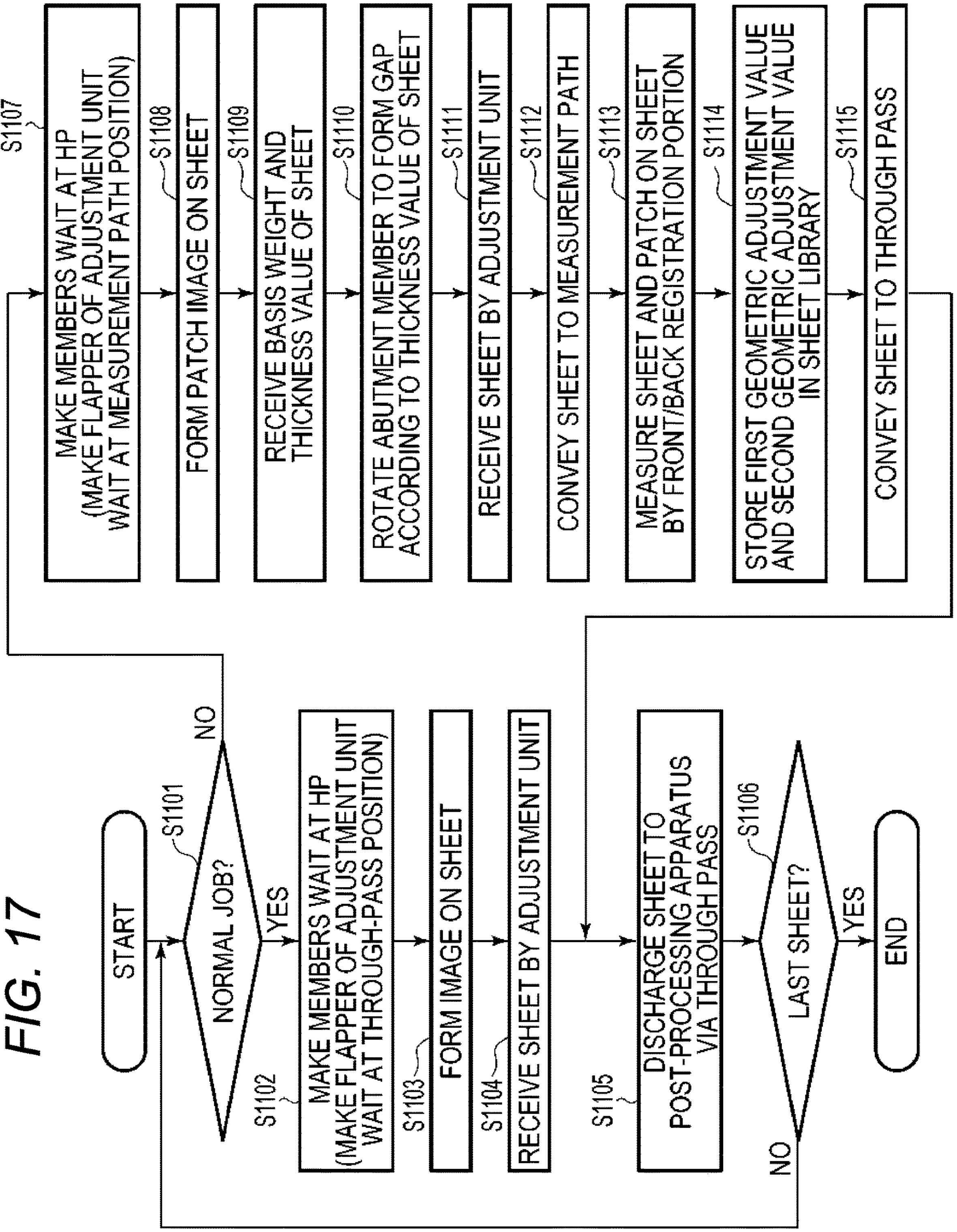
FIG. 17 is a flow chart for illustrating a control operation to convey a sheet.

Now, a control operation for conveying the sheet P in the image forming apparatus 101 and the adjustment unit 200 is described with reference to FIG. 17. FIG. 17 is a flow chart for illustrating the control operation for conveying the sheet P. The control portion 251 executes the control operation according to a program stored in an internal memory (not shown). When a job is input from the operation portion 180 by the user, the control portion 251 starts the control operation. The control portion 251 determines whether or not the job is a normal print job (Step S1101). When the job is a normal print job (YES in Step S1101), the control portion 251 makes each member of the image forming apparatus 101 and the adjustment unit 200 wait at a home position (HP) (Step S1102). At this time, in order to guide the sheet P to the through pass 230 in the adjustment unit 200, the control portion 251 makes the flapper 221 wait in a downward state (at a through-pass position) by controlling the flapper switching motor 240 (Step S1102).

The image forming apparatus 101 forms an image on the sheet P (Step S1103). The adjustment unit 200 receives the sheet P having the image formed thereon by the image forming apparatus 101 (Step S1104). The control portion 251 controls the conveyance motor 252 to cause the sheet P to be passed through the through pass 230 and discharged to the post-processing apparatus 600 by the first conveyance rollers 201, the second conveyance rollers 202, the third conveyance rollers 203, and the fourth conveyance rollers 204 (Step S1105). The control portion 251 determines whether or not the sheet P is the last sheet (Step S1106). When the sheet P is not the last sheet (NO in Step S1106), the control portion 251 returns the processing to Step S1101. When the sheet P is the last sheet (YES in Step S1106), the control portion 251 ends the control operation.

Meanwhile, when the user selects the "PRINT POSITION ADJUSTMENT" button 1002 by selecting the sheet type 910 from the sheet library 900 through the operation portion 180, a front/back registration job is input. When the job is a front/back registration job (NO in Step S1101), the control portion 251 makes each member of the image forming apparatus 101 and the adjustment unit 200 wait at the home position (HP) (Step S1107). At this time, in order to guide the sheet P to the measurement path 231 in the adjustment unit, the control portion 251 makes the flapper 221 wait in an upward state (at a measurement path position) (Step S1107).

The image forming apparatus 101 forms the patch images 820 serving as the chart for adjustment on both sides of the sheet P (Step S1108). The control portion 251 receives the basis weight and the thickness value of the sheet type 910 selected from the sheet library 900 (S1109). The control portion 251 controls the gap switching motor 802 to rotate the abutment member 707 to form the gap G according to the thickness value of the sheet (S1110). The adjustment unit 200 receives the sheet P having the patch images 820 formed thereon from the image forming apparatus 101 (Step S1111). The sheet P conveyed to the adjustment unit 200 is conveyed to the measurement path 231 by the flapper 221 (Step S1112). The sheet P is conveyed to the front/back registration portion 700 by the conveyance roller pairs 205, 206, 207, 208, 209, and 210.

The control portion 251 reads the sheet P and the patch images 820 formed on both sides of the sheet P by the front-side CIS 701 and the back-side CIS 702, respectively (Step S1113), to obtain the front-side measurement pattern image 822 and the back-side measurement pattern image 823. The front/back registration portion 700 performs line image composition with high definition, and measures print misregistration of the patch images 820 on the sheet P and the shape of the sheet P. The image processing portion 260 calculates the first geometric adjustment value 901 and the second geometric adjustment value 902 from the front-side measurement pattern image 822 and the back-side measurement pattern image 823. The image processing portion 260 stores the first geometric adjustment value 901 and the second geometric adjustment value 902 in the sheet library 900 of the image forming apparatus 101 through the communication portion 250 (Step S1114). Thus, the print position adjustment for front/back registration adjustment is brought to an end.

The sheet P that has passed through the front/back registration portion 700 is conveyed to the through pass 230 by the conveyance roller pair 214 (Step S1115). After that, the sheet P is conveyed to the discharge path 232 by the third conveyance rollers 203, and is discharged to the post-processing apparatus 600 by the fourth conveyance rollers 204 (Step S1105). The control portion 251 determines whether or not the sheet P is the last sheet (Step S1106), and when the sheet P is the last sheet (YES in Step S1106), the control portion 251 ends the control operation.

According to this embodiment, the dirt on the reading glass 703 can be reduced, and the image of the sheet P can be stably read.

The image processing portion 260, the control portion (control unit) 251, the printer controller 103, and the engine control portion 312 in this embodiment may be formed of at least one processor configured to execute the functions thereof. Further, the image processing portion 260 and the control portion (control unit) 251 may be formed of at least one processor, and the printer controller 103 and the engine control portion 312 may be formed of at least one processor.

According to this embodiment, the occurrence of jamming can be suppressed while reduction in image reading accuracy is suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-091497, filed May 26, 2020, and Japanese Patent Application No. 2020-218807, filed Dec. 28, 2020, which are hereby incorporated by reference herein in their entirety.

What is claimed is:

1. An image reading apparatus configured to read an image on a sheet conveyed from an image forming apparatus which is configured to form the image on the sheet, the image reading apparatus comprising:

a transparent member;

a reading sensor configured to read the image on the sheet, which is conveyed from the image forming apparatus, through the transparent member at a reading position in a conveyance direction in which the sheet is conveyed;

an opposed roller, which is provided at the reading position in the conveyance direction, and is provided on a side opposite to the reading sensor with respect to the transparent member, wherein the sheet is nipped by the opposed roller and the transparent member in a gap between the opposed roller and the transparent member and the opposed roller receives a rotational drive force from a driving source so as to be rotationally driven to convey the sheet which is nipped by the opposed roller;

a changing unit configured to change a size of the gap; and at least one processor configured to:

acquire information related to a thickness of the sheet; and control the changing unit so that the size of the gap becomes a first size in a case where the thickness of the sheet is a first thickness, and control the changing unit so that the size of the gap becomes a second size larger than the first size in a case where the thickness of the sheet is a second thickness larger than the first thickness.

2. The image reading apparatus according to claim 1, further comprising a conveyance unit configured to convey the sheet on which the image has been formed by the image forming apparatus, wherein the reading position is at downstream with respect to the conveyance unit in the conveyance direction.

3. The image reading apparatus according to claim 1, further comprising a reference surface, wherein the changing unit includes an eccentric cam having an abutment surface to be brought into abutment against the reference surface, and wherein the gap is changed by rotating the eccentric cam in a state in which the abutment surface abuts against the reference surface.

4. The image reading apparatus according to claim 3, wherein the reference surface is provided on the transparent member.

5. The image reading apparatus according to claim 3, wherein the eccentric cam is rotatably supported coaxially with the opposed roller.

6. The image reading apparatus according to claim 5, wherein a first cam is provided on one end side of the opposed roller, and a second cam is provided on the other end side of the opposed roller.

7. The image reading apparatus according to claim 5, further comprising a sensor configured to detect a phase of the eccentric cam.

8. The image reading apparatus according to claim 3, wherein the changing unit changes a phase of the eccentric cam according to the thickness of the sheet to change the size of the gap, and wherein the size of the gap becomes the first size in a case where the eccentric cam is located at a first phase, the size of the gap becomes the second size different from the first size in a case where the eccentric cam is located at a second phase different from the first phase, and the size of the gap becomes a third size different from the first size and the second size in a case where the eccentric cam is located at a third phase different from the first phase and the second phase.

9. The image reading apparatus according to claim 1, wherein the opposed roller is driven by the driving source different from a driving source of the changing unit.

10. The image reading apparatus according to claim 1, wherein the opposed roller has a black outer peripheral surface.

11. The image reading apparatus according to claim 1, further comprising a conveyance guide arranged upstream of the opposed roller in the conveyance direction, and to support the opposed roller.

12. The image reading apparatus according to claim 1, wherein the reading sensor is a contact image sensor.

13. The image reading apparatus according to claim 1, further comprising a sensor which is provided on a conveyance path through which the sheet passes, and is configured to detect the thickness of the sheet, wherein the at least one processor is configured to acquire the information related to the thickness of the sheet from the sensor.

14. The image reading apparatus according to claim 1, further comprising an operation unit configured to receive inputting the information related to the thickness of the sheet by a user for using the image reading apparatus, wherein the at least one processor is configured to acquire the information related to the thickness of the sheet from the operation unit.

15. An image forming system, comprising:

an image forming unit configured to form an image on a first sheet;

a transparent member;

a reading sensor configured to read the image on the sheet, which is conveyed from the image forming apparatus, through the transparent member at a reading position in a conveyance direction in which the sheet is conveyed;

an opposed roller, which is provided at the reading position in the conveyance direction, and is provided on a side opposite to the reading sensor with respect to the transparent member, wherein the sheet is nipped by the opposed roller and the transparent member in a gap between the opposed roller and the transparent member and the opposed roller receives a rotational drive force from a driving source so as to be rotationally driven to convey the sheet which is nipped by the opposed roller;

a changing unit configured to change a size of the gap; and at least one processor configured to:

acquire information related to a thickness of the first sheet;

control the changing unit so that the size of the gap becomes a first size in a case where the thickness of the first sheet is a first thickness, and control the changing unit so that the size of the gap becomes a second size larger than the first size in a case where the thickness of the first sheet is a second thickness larger than the first thickness; and set an image forming condition for forming an image on a second sheet based on image data obtained by the reading sensor.

16. An image reading apparatus configured to read an image on a sheet conveyed from an image forming apparatus which is configured to form the image on the sheet, the image reading apparatus comprising:

a transparent member;

a reading sensor configured to read the image on the sheet, which is conveyed from the image forming apparatus, through the transparent member at a reading position in a conveyance direction in which the sheet is conveyed;

an opposed roller, which is provided at the reading position in the conveyance direction, and is provided on a side opposite to the reading sensor with respect to the transparent member, wherein the sheet is nipped by the opposed roller and the transparent member in a gap between the opposed roller and the transparent member;

a rotary shaft configured to rotate the opposed roller; and a cam configured to change the gap, the cam being supported coaxially on the rotary shaft.

17. The image reading apparatus according to claim 16, further comprising a conveyance unit configured to convey the sheet on which the image has been formed by the image forming apparatus, wherein the reading position is at downstream with respect to the conveyance unit in the conveyance direction.

18. The image reading apparatus according to claim 16, further comprising a reference surface, wherein the cam has an abutment surface to be brought into abutment against the reference surface, and wherein the gap is changed by rotating the cam in a state in which the abutment surface abuts against the reference surface.

19. The image reading apparatus according to claim 18, wherein the reference surface is provided on the transparent member.

20. The image reading apparatus according to claim 16, wherein the opposed roller receives a drive force from a driving source so as to be rotationally driven to convey the sheet which is nipped by the opposed roller.

21. The image reading apparatus according to claim 16, further comprising a conveyance guide arranged upstream of the opposed roller in the conveyance direction, and to support the opposed roller.

22. The image reading apparatus according to claim 16, wherein the reading sensor is a contact image sensor.

23. The image reading apparatus according to claim 16, wherein the cam is driven for rotation on the rotary shaft independently of rotation of the opposed roller.

* * * * *